US010093137B2

(12) United States Patent
Peine et al.

(10) Patent No.: US 10,093,137 B2
(45) Date of Patent: Oct. 9, 2018

(54) WHEEL LOCALIZER, WHEEL LOCALIZATION DEVICE, SYSTEM, METHOD AND COMPUTER PROGRAM FOR LOCATING A POSITION OF A WHEEL

(71) Applicant: Infineon Technologies AG, Neubiberg (DE)

(72) Inventors: Andre Peine, Munich (DE); Michael Kandler, Sauerlach (DE); Emanuele Bruno Bodini, Munich (DE)

(73) Assignee: Infineon Technologies AG, Neubiberg (DE)

( * ) Notice: Subject to any disclaimer, the term of this patent is extended or adjusted under 35 U.S.C. 154(b) by 207 days.

(21) Appl. No.: 14/982,721

(22) Filed: Dec. 29, 2015

(65) Prior Publication Data

US 2016/0129736 A1 May 12, 2016

Related U.S. Application Data

(63) Continuation-in-part of application No. 13/969,742, filed on Aug. 19, 2013, now Pat. No. 9,251,120.
(Continued)

(51) Int. Cl.
*G06F 17/00* (2006.01)
*B60C 23/04* (2006.01)
(Continued)

(52) U.S. Cl.
CPC .......... *B60C 23/0416* (2013.01); *B60C 19/00* (2013.01); *B60C 23/0488* (2013.01); *G01B 7/30* (2013.01); *B60C 2019/004* (2013.01)

(58) Field of Classification Search
CPC ...... G06F 3/017; G06F 3/0481; B60W 40/09; B60W 10/06; B60R 16/037
See application file for complete search history.

(56) References Cited

U.S. PATENT DOCUMENTS 5,058,023 A 10/1991 Kozikaro
6,204,758 B1 3/2001 Wacker et al.
(Continued)

FOREIGN PATENT DOCUMENTS

CN 101509818 A1 8/2009
CN 101592732 A 12/2009
(Continued)

OTHER PUBLICATIONS

Johnson Controls. "A Better Way to Check Tire Pressure." Published/Copyright 2013. 2 Pages. Retrieved from http://translate.google.com/translate?hl=en&sl=de&u=http://www.johnsoncontrols.de/content/de/de/products/automotive_experience/featured-stories/advanced-tpms.html&prev=/search%3Fq%3Dhttp://johnsoncontols.de/content/de/products/automotive_experience/featured-stories/advanced-tpms.html%26biw%3D1115%26bih%3D535.
(Continued)

*Primary Examiner* — Jaehwan Oh
(74) *Attorney, Agent, or Firm* — Eschweiler & Potashnik, LLC

(57) ABSTRACT

Embodiments provide a device, a system, a method and a computer program for locating a plurality of positions of a plurality of wheels on a vehicle. The device comprises an input to obtain information related to a position of one wheel from the plurality of wheels, and a detector to obtain information related to rotational frequencies of the one wheel and of at least one other wheel of the plurality of wheels. The device further comprises a locator coupled to the input and to the detector. The locator is configured to determine information related to the position of the at least one other wheel based on the information related to the position of the one wheel and based on the information related to the rotational frequencies. Additionally or alternatively, an embodiment of the device may comprise one or (Continued)

more inputs to obtain information related to rotational frequencies of the plurality of wheels and information related to accelerations at the plurality of wheels. The device may further comprise a locator coupled to the one or more inputs. The locator is configured to determine the plurality of positions of the plurality of wheels based on the information related to the rotational frequencies of the plurality of wheels and based on the information related to the accelerations at the plurality of wheels.

10 Claims, 13 Drawing Sheets

Related U.S. Application Data

(60) Provisional application No. 61/693,509, filed on Aug. 27, 2012.

(51) Int. Cl.
    *B60C 19/00*      (2006.01)
    *G01B 7/30*      (2006.01)

(56) References Cited

U.S. PATENT DOCUMENTS

| | | | |
|---|---|---|---|
| 6,278,363 B1* | 8/2001 | Bezek | B60C 23/0416 340/442 |
| 6,389,346 B1 | 5/2002 | Gianoglio et al. | |
| 6,606,549 B1 | 8/2003 | Murakami et al. | |
| 6,826,951 B1 | 12/2004 | Schuessler et al. | |
| 8,843,267 B2* | 9/2014 | Park | B60C 23/0416 701/34.4 |
| 9,139,052 B2 | 9/2015 | Steiner | |
| 9,340,075 B2 | 5/2016 | Guan | |
| 2002/0092345 A1* | 7/2002 | Van Niekerk | G01L 17/00 73/146 |
| 2002/0092346 A1 | 7/2002 | Niekerk et al. | |
| 2003/0043031 A1* | 3/2003 | Nowottnick | B60C 23/0416 340/438 |
| 2003/0058118 A1 | 3/2003 | Wilson | |
| 2003/0076222 A1* | 4/2003 | Fischer | B60C 23/0416 340/442 |
| 2006/0087420 A1 | 4/2006 | Walraet | |
| 2007/0156320 A1 | 7/2007 | Breed et al. | |
| 2008/0129478 A1 | 6/2008 | Fink et al. | |
| 2009/0088939 A1 | 4/2009 | To et al. | |
| 2009/0198426 A1* | 8/2009 | Yasui | B60W 10/02 701/70 |
| 2010/0245068 A1* | 9/2010 | Nakayama | B60W 40/09 340/439 |
| 2010/0256874 A1* | 10/2010 | Carresjo | B60C 23/0416 701/48 |
| 2011/0016996 A1 | 1/2011 | Suda et al. | |
| 2011/0308310 A1 | 12/2011 | Strahan | |
| 2012/0029767 A1 | 2/2012 | Bailie et al. | |
| 2012/0065832 A1 | 3/2012 | Kessler et al. | |
| 2012/0242502 A1 | 9/2012 | Steiner | |
| 2013/0085710 A1 | 4/2013 | Kautzsch | |
| 2014/0195107 A1 | 7/2014 | Park | |

FOREIGN PATENT DOCUMENTS

| | | |
|---|---|---|
| CN | 201670174 U | 12/2010 |
| CN | 202138166 U | 2/2012 |
| JP | 2003154961 A | 5/2003 |
| WO | 20100022806 A1 | 3/2010 |

OTHER PUBLICATIONS

U.S. Appl. No. 13/366,771, filed Feb. 6, 2012, 34 pages.
Non Final Office Action dated Aug. 18, 2014 U.S. Appl. No. 13/366,771.
Final Office Action dated Mar. 16, 2015 U.S. Appl. No. 13/366,771.
Notice of Allowance dated Aug. 20, 2015 U.S. Appl. No. 13/366,771.
Notice of Allowance dated Sep. 17, 2015 U.S. Appl. No. 13/969,742.
Final Office Action dated Apr. 28, 2015 U.S. Appl. No. 13/969,742.
Non Final Office Action dated Sep. 4, 2014 U.S. Appl. No. 13/969,742.
Kiencke et al., Automotive Control Systems: For Engine, Driveline, and Vehicle, 2005, Springer-Verlag Berlin Heidelberg, Ed 2, p. 310-312.

\* cited by examiner

WHEEL LOCALIZER, WHEEL LOCALIZATION DEVICE, SYSTEM, METHOD AND COMPUTER PROGRAM FOR LOCATING A POSITION OF A WHEEL

REFERENCE TO RELATED APPLICATION

This application is a continuation in part of U.S. application Ser. No. 13/969,742 filed on Aug. 19, 2013, which claims priority to U.S. Provisional Application No. 61/693,509 filed on Aug. 27, 2012, the contents of which are incorporated by reference in their entirety.

FIELD

Embodiments of the present disclosure relate to a device, a system, a method and a computer program for locating a plurality of positions of a plurality of wheels on a vehicle.

BACKGROUND

Tire Pressure Monitoring Systems (TPMS) are designed to monitor the air pressure inside of pneumatic tires on various types of vehicles. Therefore pressure sensors are used in the tires and the system may report the tire pressure information to the driver of the vehicle. Wireless transmission can be used to transmit information on the pressure data to a centralized receiver component in the vehicle. Such a configuration can enable the system to report or signal pressure losses of the tires to the driver. Some known TPMS provide localization information on the tire or wheel on top of pressure information so as to indicate to a driver of a vehicle the position of a wheel having a pressure loss. Examples are indications on whether a pressure loss of a tire of a wheel of a car is on the Front Left (FL) tire, the Front Right (FR) tire, the Rear Left (RL) tire, and/or the Rear Right (RR) tire. After replacement of a wheel or tire, assignment or re-assignment of the sensor signals to the positions on the vehicle may be necessary. Such assignment can be carried out manually, for example, by using a Low-Frequency (LF) initializer, which is used to initialize each individual sensor upon indication from a system receiver. The initialization can be affected by sequentially activating an LF-initiator in the proximity of the respective sensor and receiving an according response with a unique identification from the sensor.

Some known TPMS systems utilize multiple LF-initializers, e.g. in terms of transmitter coils or inductors, for initialization of each individual sensor or wheel, for example, they can be mounted in the wheel housing of each wheel. The number of involved LF-initializers may render such an approach uneconomic. For example, an identification of the sensor may then be assigned to an initialized position on the vehicle, which assumes that the according initialization procedure is carried out correctly after a change of tires, replacement of a wheel, etc. Other concepts make use of different reception levels of the LF-radio signals using transmitter coils at different locations asymmetric to the wheels, e.g. one in the front and one in the back. These concepts are extensive and unsuitable for after-market installation. Further concepts make use of the varying reception power of the RF-signals transmitted by the sensors. The reception power of such an RF-signal can be measured and the different locations can be distinguished by the different reception levels, e.g. evoked by different distances of the wheels. The larger the distance between a wheel and the corresponding receiver the lower the reception power. In some cars a distinction between the signals from the front and the signals from the back is possible, as the receiver is located at an asymmetric position i.e. close to a rear axis, a distinction between signals from the left and right is rather difficult. Some concepts may use a set of acceleration sensors, which are installed in an orthogonal manner in each wheel to determine the rotational direction of the wheels to distinguish left and right wheels. This concept may suffer from the complex propagation paths of the wireless signals, which may render an assignment of a reception level of a signal to a certain wheel difficult.

Another concept uses ABS (Anti-lock Braking System) signals to determine rotational frequencies of the wheels and relate or correlate them to rotational frequencies determined based on TPMS signals, which may make use of acceleration sensors determining the acceleration changes as the sensor rotates with the wheel in gravitation. This concept, however, may be difficult to establish if the signals of the ABS system cannot be made available. This may render the concept unsuitable for after-market systems.

SUMMARY

Embodiments make use of information related to rotational frequencies of the wheels of a vehicle. From relations between the rotational frequencies embodiments may derive relations of the corresponding positions of the wheels. Once the position of one wheel is known, embodiments are based on the finding that the relations between the rotational frequencies may allow concluding on or determining the positions of one or more other wheels. Some embodiments may use information related to the rotational frequencies of the wheels and information related to accelerations at the wheels to determine the positions of the wheels, possibly without using a known position of at least one wheel. In the following a vehicle can be any vehicle using tires, as, for example, a car, a van, a truck, a bus, a plane, a bike, a motorbike, etc. Although, many embodiments will be exemplified using a car, any other vehicle can be utilized in embodiments.

Embodiments provide a device for locating a plurality of positions of a plurality of wheels on a vehicle. The device comprises an input to obtain information related to a position of one wheel from the plurality of wheels. The device further comprises a detector to obtain information related to rotational frequencies of the one wheel and of at least one other wheel of the plurality of wheels. The device further comprises a locator, which is coupled to the input and to the detector. The locator is configured to determine information related to the position of the at least one other wheel based on the information related to the position of the one wheel and based on the information related to the rotational frequencies. Embodiments may enable determining the position of multiple wheels based on one wheel with a known position and information related to rotational frequencies of the multiple wheels.

In embodiments the locator may be configured to determine the information related to the position of the at least one other wheel based on at least one predetermined relation between a rotational frequency of the one wheel and a rotational frequency of the at least one other wheel. Embodiments may take advantage of predetermined relations between the rotational frequencies and may therefore enable determination of the positions of other wheels without collecting further information, e.g. from ABS systems or other components. In some embodiments the detector may comprise at least one of an acceleration sensor, an energy harvester, a shock sensor, a tire pressure monitoring system sensor, or an optical sensor to obtain a signal comprising the information related to the rotational frequencies of the one wheel and the at least one other wheel. Embodiments may re-use components fulfilling further purposes to determine the information related to the rotational frequencies of the plurality of wheels.

In embodiments the input, the locator, respectively, may be configured to receive the information related to the position of the one wheel of the plurality of wheels from a radio frequency receiver. Such a radio frequency receiver may be coupled to the input and may receive radio signals from transmitters located at or in the wheels, e.g. TPMS modules. The information related to the position of the at least one wheel may comprise information related to an identification of a tire pressure measurement module of a wheel at a predetermined position. For example, since the identification of the module at the predetermined position may be mapped to one of the rotational frequencies, the rotational frequency at the position may be identified. Interrelations between the rotational frequencies may be used to identify the rotational frequencies at the other positions.

The locator may be configured to use information on rotational frequencies for each of the plurality of wheels on the vehicle and determine a position for each of the plurality of wheels on the vehicle based on the information on the plurality of rotational frequencies and the information related to the position of the one wheel. For example, the locator may be configured to assign predefined positions on the vehicle to each of the plurality of wheels based on the information related to the plurality of rotational frequencies and information related to relations between the rotational frequencies of the plurality of wheels. The relations may be based on the geometry of predetermined positions of the plurality of wheels. Embodiments may use knowledge about the geometry of the vehicle to determine according predetermined relations of the rotational frequencies of the wheel of the vehicle. In a further embodiment the vehicle may be a car comprising four wheels as plurality of wheels. The detector may be configured to determine information related to relations of rotational frequencies of the four wheels. The locator may be configured to assign a predetermined position to each of the four wheels and the locator may be configured to assign the two wheels with the highest rotational frequencies to one side of the vehicle and the two wheels with the lowest rotational frequencies to the other side of the vehicle. The locator may be configured to determine a relation of the rotational frequencies between the one wheel and a wheel assigned to the same side as the one wheel, and the locator may be configured to assign predetermined positions to the other wheels on the other side of the vehicle using the same relation.

Embodiments further provide a system for locating a plurality of positions of a plurality of wheels on a vehicle comprising a device according to the above description. The device may further comprise a module, which is coupled to the input, and which is configured to provide the information related to the position of the one wheel to the locator via the input. In some embodiments the module comprises a memory for storing the information related to the position of the one wheel. Embodiments may hence use stored information based on which the positions are determined. In some embodiments the module may comprise a low frequency initiator located in the proximity of a tire pressure measurement module of the one wheel. The low frequency initiator may be configured to initiate the tire pressure measurement module and the system may further comprise a radio frequency receiver configured to obtain information related to an identification of the tire pressure measurement module and to provide the information related to the identification as information related to the position of the one wheel via the input. Embodiments may initiate a single TPMS module to determine its identification, the identification as its position, respectively.

The radio frequency receiver may be configured to receive information related to a low frequency signal reception quality at multiple tire pressure measurement modules located in multiple tires as information related to the position of the one wheel in some embodiments. The locator may be configured to determine the position of the one wheel based on the information related to the signal reception quality. The information related to the signal reception quality may comprise identification information of a tire pressure measurement module at which the signal was received, in line with the above.

In some further embodiments the module may comprise a radio frequency receiver located in the proximity of a tire pressure measurement module of the one wheel. The radio frequency receiver may be configured to receive a radio signal from the tire pressure measurement module and to obtain information related to an identification of the tire pressure measurement module. Radio frequency receiver may be configured to provide the information related to the identification as information related to the position of the one wheel via the input.

The radio frequency receiver may further be configured to determine information related to receive signal strengths of multiple tire pressure modules in some embodiments and to provide the information related to the receive signal strength from the multiple tire pressure measurement modules as information related to the position of the one wheel. The locator may be configured to determine the position of the one wheel based on the information related to the receive signal strength.

Embodiments further provide a method for determining four wheel positions of four wheels of a car. The method comprises obtaining information related to a position of one wheel from the four wheels, and obtaining information related to relations of rotational frequencies of the four wheels. The method further comprises determining positions of three other wheels based on the information related to the position of the one wheel and based on the information related to relations of the rotational frequencies of the four wheels.

Embodiments further provide a method for locating a plurality of positions of a plurality of wheels on a vehicle. The method further comprises obtaining information related to a position of one wheel from the plurality of wheels. The method further comprises obtaining information related to rotational frequencies of the one wheel and of at least one other wheel of the plurality of wheels. The method further comprises determining information related to the position of the at least one other wheel based on the information related to the position of the one wheel and based on the information related to the rotational frequencies.

Embodiments further provide another device for locating a plurality of positions of a plurality of wheels on a vehicle. The device comprises one or more inputs to obtain information related to rotational frequencies of the plurality of wheels and information related to accelerations at the plurality of wheels. The device further comprises a locator coupled to the one or more inputs. The locator is configured to determine the plurality of positions of the plurality of wheels based on the information related to the rotational frequencies of the plurality of wheels and based on the information related to the accelerations at the plurality of wheels. Embodiments may determine wheel positions on the vehicle based on rotational frequencies and accelerations of the wheels of the vehicle. In some embodiments the information related to the accelerations at the plurality of wheels comprises information related to accelerations of multiple directions at the plurality of wheels. Accelerations of multiple directions may allow distinguishing wheels located on different sides of the vehicle.

In further embodiments the locator may be configured to determine the information related to the plurality of positions based on assigning predetermined wheel positions along a longitudinal axis of the vehicle and based on assigning predetermined wheel positions along a lateral axis of the vehicle. Embodiments may enable wheel positioning by distinguishing wheel locations along longitudinal and lateral axes of the vehicle. The locator may be configured to assign the predetermined wheel positions along the longitudinal axis of the vehicle based on the information related to the rotational frequencies of the plurality of the wheels. The locator may be configured to assign the predetermined positions along the lateral axis of the vehicle based on the information related to the acceleration at the plurality of the wheels. Embodiments may allow assigning multiple positions to the wheels of the vehicle using wheel accelerations for lateral assignments and wheel rotational or angular speed for longitudinal assignment.

In some embodiments the plurality of wheels may comprise four wheels of a car having a front axis and a rear axis. The locator may be configured to determine whether a wheel is located on the front axis or on the rear axis based on the information related to the rotational frequencies of the wheels. The locator may be configured to determine whether a wheel is located on the right or left side of the car based on the information related to the accelerations at the four wheels. Embodiments may enable wheel localization on a car without using ABS signals and without using at least one known position of a wheel.

The information related to the accelerations may comprise information related to tangential and radial accelerations at the four wheels, for example, at each of the wheels. Embodiments may use radial and tangential accelerations to distinguish wheels on different sides of the vehicle. Embodiments further provide a method for locating a plurality of positions of a plurality of wheels on a vehicle. The method comprises obtaining information related to rotational frequencies of the plurality of wheels, and obtaining information related to accelerations at the plurality of wheels. The method further comprises determining the plurality of positions of the plurality of wheels based on the information related to the rotational frequencies of the plurality of wheels and based on the information related to the accelerations at the plurality of wheels.

Embodiments further provide a computer program and/or a computer program product having a program code on a non-transitory media for performing, when the computer program is executed on a computer or on a processor, one of the methods described herein.

Further embodiments may make use of information on a state of movement or on a steering angle of the vehicle. The state of movement may have implications on the location and a state of a wheel. In the following the state of movement of a vehicle refers to a movement status, a motion status, a driving or movement situation, a movement or driving condition, etc., as for example, a forward movement, a backward movement, a movement along a right hand bend or curve, a movement along a left hand bend or curve, etc. Some embodiments using information related to the state of movement or steering angle of the vehicle, may determine a position with or without the above information related to the position of the one wheel. The above described embodiments may additionally or alternatively use information on a state of movement or steering angle of the vehicle to determine the positions of one or more wheels.

A further embodiment may be a system for locating a position of a wheel on a vehicle. The system may comprise a detector for obtaining information related to the state of movement of the vehicle and a locator for determining the position of the wheel based on the information related to the state of movement of the vehicle. In further embodiments the locator may be operable to further use information on a rotational frequency of the wheel to determine the position of the wheel based on the information related to the state of movement of the vehicle. Embodiments may make use of the finding that a certain state of movement of a vehicle may imply a certain relation of the rotational frequencies of the wheels. In other words, embodiments may make use of the finding that the RR wheel of a car moving forward along a right hand bend may have a lower rotational frequency than any of the other wheels on the car, assuming equal circumferences of the wheels. Therefore, if the information related to the state of movement indicates a forward right hand bend the locator may determine the position of the wheel being indicated as the one with the lowest rotational frequency as the RR wheel. Such relations may as well be exploited in the above described embodiments using one wheel at a known position and said relation to conclude or determine position of other wheels.

In some embodiments the information related to the state of movement may comprise information on a sense of a rotation of the vehicle. The sense of rotation of a vehicle may be used to determine expected rotational frequencies or expected relations of rotational frequencies of the wheels associated with the sense of rotation of the vehicle. In further embodiments the information related to the state of movement may comprise information on a direction of the movement of the vehicle, e.g. information on whether the vehicle moves forward or backward, along a right hand bend or a left hand bend, etc. Information on the direction of the movement of the vehicle may also be used to determine expected rotational frequencies or expected relations of rotational frequencies of the wheels associated to the sense of rotation of the vehicle.

The locator may be operable to use information on rotational frequencies for each of a plurality of wheels on the vehicle, as, for example, four wheels of a car. The locator may be further operable to determine a position for each of the plurality of wheels on the vehicle based on the information on the plurality of rotational frequencies and the information related to the state of movement of the vehicle. In other words, the locator may determine predefined positions of the four wheels of a car, by determining four rotational frequencies, one for each of the wheels, and by determining four expected rotational frequencies based on the information related to the state of movement. In some embodiments the locator or detector comprises an interface to receive information on an expected rotational frequency from a device configured to determine information related to one or more expected rotational frequencies of one or more wheels of a vehicle. That is to say, information related to the expected rotational frequencies may be provided to the locator, which may then carry out a correlation between the expected rotational frequencies and the rotational frequencies determined from a sensor to determine one or more positions of the wheel(s). In some embodiments information related to rotational frequencies of one or more wheels of the vehicle may be provided to the detector, e.g. as information related to a state of movement or related to a steering angle of the vehicle.

Hence, in further embodiments the locator may be operable to use information on rotational frequencies for each of the plurality of wheels on the vehicle and to determine the position for each of the plurality of wheels on the vehicle based on the information on the plurality of rotational frequencies and the information related to the state of movement of the vehicle. Moreover, the locator may be operable to assign predefined positions on the vehicle to each of the plurality of wheels based on the information on the plurality of rotational frequencies and expected rotational frequencies, wherein the expected rotational frequencies are based on the information related to the state of movement, or information related to the expected rotational frequencies is obtained or received through an interface of the locator or detector. In other words, embodiments may be based on the finding that if the information on the state of movement indicates that a car as a vehicle moves forward along a right hand bend, then the expected rotational frequency of the RR wheel is the lowest and that of the FL wheel is the highest. A correlation or a matching of the expected rotational frequencies based on the information on the state of movement or the received information and the information on the rotational frequencies of the wheels may be carried out to determine the positions of the wheels. According to the above, once one position is known, such relation or correlation may be used to determine positions of other wheels.

In an embodiment, the locator may be operable to sort the wheels based on their rotational frequencies, to sort the predefined positions of the wheels based on the state of movement, or the information related to the expected rotational frequencies, and a corresponding rotational velocity of the wheels, and to match the ranks of the sorted wheels and the sorted predefined positions.

Moreover, in embodiments the system or the detector may comprise a sensor for determining the information related to the state of movement. The sensor may generate a signal based on which the information related to the state of movement can be determined. The sensor may correspond to at least one of an inertial sensor, a micro-mechanical sensor, an acceleration sensor, or a gyroscope for generating a signal based on which the state of movement is detectable. In some embodiments the system may further comprise an acceleration sensor, an energy harvester, a shock sensor, or a TPMS sensor to obtain the information on the rotational frequency of the wheel.

The system may be operable to verify signals involved in the location determination before actually determining the location or position of a wheel, or before determining any signal based on which the location should be determined subsequently, respectively. In other words, the system may be operable to determine the location of the wheel or signals based on which the location of the wheel can be determined, when the information related to the state of movement of the vehicle indicates a certain state of movement. In some embodiments trigger information for the location determination may be provided through an interface of the locator. Furthermore, the system may determine the location of the wheels or the respective signals, only if the certain state of movement is maintained for a certain time period, when trigger information is received, respectively. In other words, in embodiments the system may be operable to determine the location of the wheel or the respective signals only if a stable or an enduring state of movement has been detected before, when trigger information is received, respectively. Thus, in embodiments the system may be operable to verify a signal indicating the rotational frequency of the wheel and a signal indicating the state of movement of the vehicle before using the signals as information to determine the position of the wheel. In yet another embodiment the system may be operable to verify whether the rotational frequency of the wheel and a rotational rate of the vehicle, which is based on the state of movement of the vehicle, fulfill a predefined relation for a predefined time interval, e.g. their quotient has not been above or below a certain threshold. Thus, the locator may be operable to determine the position of the wheel, when changes of the state of movement of the vehicle have been below a predefined threshold for a predefined time interval, when trigger information is received, respectively.

In some embodiments the locator may comprise an interface to receive information related to a trigger on when to determine the position. The locator may then be configured to determine the position of the wheel when the information related to the trigger is received. That is to say that in some embodiments the time or state of the vehicle when to determine the position of a wheel may be indicated to the locator, for example, by a device configured to determine information related to one or more expected rotational frequencies of one or more wheels of the vehicle. Details on such a device will be provided subsequently.

Furthermore, in embodiments the locator may be operable to determine a corrected rotational frequency of the wheel based on information on a tire pressure of a tire of the wheel and based on the rotational frequency of the wheel. The locator may be operable to determine the position of the wheel based on the corrected rotational frequency. Thus, if a tire pressure signal is available, the rotational frequency of a wheel may be corrected based on the tire pressure signal. For the location determination the corrected signal may then be taken into account.

In line with the above summary for embodying a system for locating a position of a wheel on a vehicle, embodiments may provide a wheel localizer for locating the position of the wheel on the vehicle. The wheel localizer may comprise a detector with an output for a movement signal comprising information on a state of movement of the vehicle. In other words, the movement signal may comprise information related to the state of movement of the vehicle. The wheel localizer further comprises a locator with an input terminal for the movement signal, and an output for a location signal comprising information on the position of the wheel, which is based on the information on the state of movement of the vehicle.

Moreover, embodiments may provide a corresponding wheel localization device, which comprises an input for receiving a signal comprising information on the state of movement of the vehicle or information related to a position of one wheel from a plurality of wheels. Such a signal may, in some embodiments, be generated by a sensor. The input further receives signals comprising information indicating rotational frequencies of each of a plurality of wheels of the vehicle, e.g. for each of the four wheels of a car. In some embodiments acceleration sensors or TPMS sensors in the wheels or tires may be used to determine signals based on which the rotational frequencies are determined. The input further receives signals comprising information indicating a tire parameter for each of the plurality of wheels, which may, in some embodiments, be TPMS signals from a TPMS sensor. The wheel localization device further comprises a unit to assign to each of the plurality of wheels one location of a set of predefined locations based on the information on the state of movement and the information on the rotational frequencies.

Furthermore, embodiments may provide a method for locating a position of a wheel on a vehicle. Such method may be part of a computer program in some embodiments. In other words, the computer program may have a program code for performing, when the computer program is executed on a computer or on a processor, one of the methods described herein. Such a method may comprise obtaining information related to a state of movement of the vehicle and determining the position of the wheel based on the information related to the state of movement of the vehicle.

Embodiments may also provide a device comprising a wheel localizer to determine a position for each of a plurality of wheels of a vehicle. The wheel localizer may be configured to determine a wheel position based on information indicating a rotational frequency of each wheel and information related to a rotation of the vehicle, information related to a position of one wheel from the plurality of wheels, respectively. The information indicating the rotational frequency of the wheel may be determined from a signal, which is generated in the tire of the respective wheel. In some embodiments such a signal may be generated using a TPMS sensor in the respective wheel.

According to further embodiments, a correlation with information on a steering angle of the vehicle can be used to determine the position of the wheel. That is to say that the information on the state of movement may correspond to information on a steering angle of the vehicle. In such an embodiment the system for locating a position of a wheel on a vehicle may comprise a detector configured to obtain information related to a steering angle of the vehicle. Moreover the system may comprise a locator configured to determine the position of the wheel based on the information related to the steering angle of the vehicle. The information related to the steering angle may determine the state of movement of the vehicle, e.g. whether it moves along a right hand bend or a left hand bend. The information related to the steering angle may comprise further information related to a state of movement of the vehicle, e.g. whether the vehicle moves forward or backward or even information on the speed or velocity of the vehicle.

The detector may comprise at least one of an angular sensor, a traverse arm position sensor, an optical sensor, or a magnetic sensor, wherein each are configured to generate a signal based on which the steering angle is detectable. In other words, the detector may comprise a sensor, which is capable of determining the information related to the steering angle, for which there are multiple possibilities. For example, a signal from a power steering unit may be determined, e.g. using an angular sensor. In some embodiments, a signal, which is also used for an Electronic Stability Control (ESP), may be used for determining the steering angle. A position of the steering wheel indicative of a steering angle may be monitored using a magnetic or an optical sensor, which may, for example monitor magnetic or optical checkmarks on the steering wheel, a steering shaft or axis, or a steering column.

Another possibility is to determine the position of a traverse arm or other mechanical devices being coupled to a wheel. Therewith the position of the traverse arm can be indicative of the position or orientation of the wheel and hence of a steering angle. Other possibilities arise from using an optical sensor, which can monitor a wheel directly or any mechanical parts connected or coupled to the steering, e.g. checkmarks on a steering axle or shaft, or on a traverse arm. The locator may be configured to further use information on a rotational frequency of the wheel to determine the position of the wheel based on the information related to the steering angle in line with what is described above. The locator may be configured to use information on rotational frequencies for each of a plurality of wheels on the vehicle and determine a position for each of the plurality of wheels on the vehicle based on the information on the plurality of rotational frequencies and the information related to the steering angle of the vehicle, also in line with what was described above.

Further in line with the above description the locator may be operable to assign predefined positions on the vehicle to each of the plurality of wheels based on the information on the plurality of rotational frequencies and expected rotational frequencies (a known position of at least one wheel, respectively), wherein the expected rotational frequencies are based on the information related to the steering angle and information related to a speed of the vehicle. In some embodiments the information related to the speed of the vehicle may indicate whether the vehicle is moving or not, in other embodiments it may comprise information indicative of the actual speed of the vehicle. In other words, the locator may determine expected rotational frequencies based on the information on the steering angle and information on the speed of the vehicle, or it may receive information related to expected rotational frequencies through an interface. In some embodiments just relations of the expected rotational frequencies may be determined, i.e. which wheel spins the fastest, second fastest, slowest, second slowest, etc. The same relations can then be determined from the plurality of rotational frequencies and matched with the expected relations. Therewith, the rotational frequencies can be assigned to predetermined positions of the wheels. In other embodiments more exact expected rotational frequencies may be determined, e.g. also considering the geometrics of the vehicle, e.g. distances between the axis, between the wheels, width of the vehicle/axis, length of the vehicle/axis, etc.

According to the above, the system may further comprise an acceleration sensor, an energy harvester, a shock sensor or a tire pressure monitoring system sensor configured to obtain the information on the rotational frequency of the wheel. A shock-sensor may determine acceleration changes, i.e. it may measure or determine a derivative of the acceleration with respect to time. The system may be operable to verify a signal indicating the rotational frequency of the wheel and a signal indicating the steering angle of the vehicle before using the signals as information to determine the position of the wheel. For example, the system may be operable to verify that the rotational frequency of the wheel and a rotational rate of the vehicle, which can be based on the steering angle of the vehicle, fulfill a predefined relation for a predefined time interval, accordingly. For example, the locator is operable to determine the position of the wheel when changes of the steering angle of the vehicle are below a predefined threshold for a predefined time interval to assure a certain stability of the according signals or values, when the trigger information is received through the interface, respectively. Further in line with the above described embodiments the locator may be operable to determine a corrected rotational frequency of the wheel based on information on a tire pressure of a tire of the wheel and based on the rotational frequency of the wheel, and the locator may be operable to determine the position of the wheel based on the corrected rotational frequency.

In other words, embodiments may provide a wheel localizer for locating a position of a wheel on a vehicle, which comprises a detector configured to output a steering signal comprising information on a steering angle of the vehicle and a locator configured to receive the steering signal, and configured to generate a location signal comprising information on the position of the wheel based on the information on the steering angle of the vehicle. The detector may comprise at least one of an angular sensor, a traverse arm position sensor, a magnetic sensor, or an optical sensor, wherein each are configured to sense the steering angle of the vehicle. Further in line with the above, the locator may further comprise an input configured to receive a signal comprising information on a rotational frequency of the wheel. At least one of a sensor, an angular sensor, a traverse arm position sensor, an optical sensor an acceleration sensor, an energy harvester, a shock sensor, or a tire pressure monitoring system sensor may be coupled to the locator. The locator may further comprise an input configured to receive a signal comprising information related to a speed of the vehicle, which, in some embodiments, may only indicate that the vehicle is moving at all.

According to the above described embodiments the wheel localizer may be further configured to verify a signal comprising information on the rotational frequency of the wheel and the steering signal comprising the information on the steering angle of the vehicle, before using these signals as information to determine the position of the wheel. The wheel localizer can be further configured to verify that the signal comprising the information on the rotational frequency of the wheel and the steering signal comprising the information on the state of movement of the vehicle fulfill a predefined relation for a predefined time interval. The locator may comprise one or more inputs configured to receive signals comprising information on a plurality of rotational frequencies for each of a plurality of wheels. The locator may be configured to determine a plurality of locations for the plurality of wheels on the vehicle, based on the information on the plurality of rotational frequencies and on the information of the state of movement.

The locator may be configured to assign predefined positions on the vehicle to each of the plurality of wheels based on the information on the plurality of rotational frequencies and expected rotational frequencies (a known position of at least one wheel, respectively), wherein the expected rotational frequencies are based on the information of the steering angle. The locator may further comprise an input configured to receive a signal comprising information on a tire pressure of a tire of the wheel, and the locator may be operable to determine a corrected rotational frequency of the wheel based on the information on the tire pressure of the tire of the wheel. The locator may be operable to output the information on the location of the wheel based on the corrected rotational frequency.

Embodiments further provide a wheel localization device, which comprises an input configured to receive a signal comprising information on a steering angle of the vehicle (a known position of at least one wheel, respectively), signals comprising information indicating rotational frequencies of each of a plurality of wheels of the vehicle, and signals comprising information indicating a tire parameter for each of the plurality of wheels. The wheel localization device may further comprise a unit configured to assign to each of the plurality of wheels one location of a set of predefined locations based on the information on the steering angle and the information on the rotational frequencies. Furthermore, embodiments may provide a method for locating a position of a wheel on a vehicle. The method comprises obtaining information related to a steering angle of the vehicle and determining the position of the wheel based on the information related to the steering angle.

In embodiments the method may further comprise using information on a rotational frequency of the wheel for the determining of the position of the wheel based on the information related to the steering angle. The using may comprise using information on rotational frequencies of a plurality of wheels on the vehicle, and the determining may comprise determining positions for each of the plurality of wheels on the vehicle based on the information on the plurality of rotational frequencies and the information related to the steering angle. The determining may comprise assigning predefined positions on the vehicle to each of the plurality of wheels based on the information on the plurality of rotational frequencies and expected rotational frequencies, where expected rotational frequencies can be based on the information related to the steering angle. The method may further comprise verifying a signal indicating the rotational frequency of the wheel and a signal indicating the steering angle of the vehicle, before using the signals as information to determine the position of the wheel. The verifying may verify that the rotational frequency of the wheel and a rotational rate of the vehicle, which is based on the steering angle of the vehicle, fulfill a predefined relation for a predefined time interval. The method may further comprise correcting the rotational frequency of the wheel based on information on a tire pressure of a tire of the wheel to determine a corrected rotational frequency. The determining of the position of the wheel can be based on a corrected rotational frequency. Embodiments further provide a computer program having a program code on a non-transitory media for performing, when the computer program is executed on a computer or on a processor, one of the above methods for locating a position of a wheel on a vehicle. In line with the above, some embodiment of the method may determine a position after receiving information related to a trigger for the location determination.

Embodiments further provide a device, which is configured to determine information related to one or more expected rotational frequencies of one or more wheels of a vehicle. The device may be part of or comprised in, for example, a navigation system, a smart phone, a handheld computer, a laptop, an entertainment system etc. The device comprises a path detector configured to determine expected path lengths of the one or more wheels of the vehicle based on information related to a path of the vehicle. The device further comprises a controller configured to determine the information related to the one or more expected rotational frequencies of the one or more wheels of the vehicle based on the expected path lengths of the one or more wheels. The path detector may correspond to any module, unit, or device, which is configured to determine, calculate or compute a length a wheel travels based on the path or route of the vehicle itself. The controller may correspond to any module, unit, or device, which is configured to determine, compute, or calculate the information related to the one or more expected rotational frequencies of the one or more wheels of the vehicle based on the expected path lengths of the one or more wheels. The controller or path detector may correspond to any controller module, unit or device, which may, at least in some embodiments be programmable, e.g. a micro-processor, a central processing unit, etc.

In some embodiments the path detector may obtain the path of the vehicle itself, e.g. by tracking or monitoring the vehicle. In embodiments the path detector may comprise a Global Positioning System (GPS) receiver—or any other navigation unit. In some embodiments the device may further comprise a navigation module configured to determine the information related to the path of the vehicle based on information related to a route of the vehicle. The navigation module may comprise a GPS—or any other navigation unit, which allows tracking, determining, or predicting a route or path of the vehicle. For example, the route may be entered by a user, e.g. in terms of a destination of a trip to which the actual route is then determined or calculated based on navigational map data. In some embodiments a navigation system, comprising the above components, may determine the path lengths for one or more wheels of the vehicle based on the route or a part of the route of the vehicle and correlates the information related to corresponding rotational frequencies, respectively, with measured or otherwise determined rotational frequencies, e.g. using the above described sensors, such as a TPMS sensor and the signals received therefrom. In some embodiments the controller is further configured to determine the information related to the expected rotational frequencies of the one or more wheels of the vehicle based on predefined geometry information of the one or more wheels of the vehicle. The geometry information may comprise information related to, e.g., distances between the axis, between the wheels, width of the vehicle/axis, length of the vehicle/axis, etc.

For example, the information related to the rotational frequencies comprises information related to an order of expected rotational frequencies or expected path lengths of a plurality of wheels of the vehicle. In some embodiments relations of the expected rotational frequencies may be determined, i.e. which wheel spins or rotates the fastest, second fastest, slowest, second slowest, etc. The same relations can then be determined from the plurality of rotational frequencies obtained from, for example, the TPMS sensors and matched with the expected relations. Therewith, the rotational frequencies can be assigned to predetermined positions of the wheels. In other embodiments more exact expected rotational frequencies may be determined, e.g. also considering the geometrics of the vehicle, e.g. distances between the axis, between the wheels, width of the vehicle/axis, length of the vehicle/axis, etc.

In further embodiments the controller may be configured to determine one or more positions of the one or more wheels of the vehicle based on the information related to the expected rotational frequencies of the one or more wheels. Similar to the above, the controller may be configured to correlate the expected rotational frequencies with rotational frequencies, which are measured or determined using a sensor etc. Embodiments may enable an assignment of a position of a wheel to be carried out automatically, which may be more comfortable and less erroneous than manually assigning after a wheel change or new initialization of sensors. Embodiments may further enable to be retro-fitted to existing sensors, systems etc. That is to say that some embodiments may be adapted to existing systems. For example, embodiments may be integrated in a portable device, e.g. a smart phone or a portable navigation system, which may then determine the positions and even display the tire pressures.

In some embodiments, the controller may comprise an interface configured to provide the information related to the one or more expected rotational frequencies of the one or more wheels of the vehicle to a system for locating a position of a wheel on a vehicle in line with the above description. In some embodiment the interface may be configured to provide information related to a trigger when to determine the position of a wheel, also in line with the above description. In other words, based on the route of the vehicle and the differences in the path lengths of the wheels or rotational frequencies of the wheels, advantageous points in time or moments for the localization of the wheel may be determined, and information thereon may be provided as trigger information. The controller may be configured to provide the information related to the trigger, when the expected rotational frequencies of the one or more wheels of the vehicle fulfill a predefined criterion. For example, the information related to the trigger may be provided when the differences of expected rotational frequencies or path lengths of the wheels of the vehicle differ by more than a predefined threshold.

In line with the above, in some embodiments the controller may comprise an interface configured to receive information related to one or more tire pressures of the one or more wheels of the vehicle. The interface may further be configured to receive information related to one or more rotational frequencies of the one or more wheels. The controller may be configured to associate the information related to the one or more tire pressures to one or more positions of the one or more wheels based on the information related to the one or more rotational frequencies and based on the information related to the one or more expected rotational frequencies of the one or more wheels of the vehicle. For example, the controller may correlate the path lengths or expected rotational frequencies with the information, e.g. a signal, related to the tire pressures, which may comprise information related to measured rotational frequencies of the one or more wheels. For example, the wheel with the longest path lengths or highest expected rotational frequency may be associated with the wheel having the highest measured rotational frequency; the wheel with the second longest path lengths or second highest expected rotational frequency may be associated with the wheel having the second highest measured rotational frequency and so on.

The path detector may be configured to determine an expected path lengths for each of a plurality of wheels on the vehicle based on the information related to the path of the vehicle. The controller may be configured to determine information related to an expected rotational frequency for each of the plurality of wheels on the vehicle. For example, the vehicle may have four wheels and the path detector may correspondingly determine four path lengths and the controller may correspondingly determine four expected rotational frequencies. The controller may be configured to determine a position for each of the plurality of wheels on the vehicle based on the information on the plurality of expected rotational frequencies and based on the expected path lengths for each of the plurality of wheel of the vehicle. For example, four positions for four wheels of the vehicle may be determined. In some embodiments the controller may be configured to assign predefined positions on the vehicle to each of the plurality of wheels based on the information on the plurality of expected rotational frequencies. For example, the above described correlation may be used. Such correlation may be based on a ranking of the paths lengths or expected rotational frequencies and an according ranking of the measured rotational frequencies, e.g. on the basis of sensor signals.

In some embodiments the device may comprise an interface configured to receive information related to tire pressures for each of the plurality of wheels of the vehicle. The interface may be further operable to receive information related to a rotational frequency for each of the plurality of wheels of the vehicle, which may correspond to measured rotational frequencies, in line with the above description. The controller may be configured to associate the information on the tire pressures to positions of each of the plurality of wheels based on the information related to the rotational frequency for each of the plurality of wheels and based on the information related to the expected rotational frequency for each of the plurality of wheels of the vehicle.

Embodiments further provide a method for determining information related to one or more expected rotational frequencies of one or more wheels of a vehicle. The method comprises determining expected path lengths of the one or more wheels of the vehicle based on information related to a path of the vehicle. The method further comprises determining the information related to the one or more expected rotational frequencies of the one or more wheels of the vehicle based on the expected path lengths of the one or more wheels. The method may further comprise determining the information related to the path of the vehicle based on information on a route of the vehicle. In line with the above, the method may comprise determining the information related to the expected rotational frequencies of the one or more wheels of the vehicle based on predefined geometry information of the one or more wheels of the vehicle.

In some embodiments the information related to the rotational frequencies comprises information related to an order of expected rotational frequencies of a plurality of wheels of the vehicle. The method may comprise determining one or more positions of the one or more wheels of the vehicle based on the information related to the expected rotational frequencies of the one or more wheels. According to the above, the method may comprise receiving information related to one or more tire pressures of the one or more wheels of the vehicle and receiving information related to one or more rotational frequencies of the one or more wheels. The method may comprise associating the information on the one or more tire pressures to one or more positions of the one or more wheels based on the information related to the one or more rotational frequencies and based on the information related to the one or more expected rotational frequencies of the one or more wheels of the vehicle.

The method may comprise determining a path length for each of a plurality of wheels on the vehicle based on the information related to the path of the vehicle. Information related to an expected rotational frequency for each of the plurality of wheels on the vehicle may be determined. A position for each of the plurality of wheels on the vehicle may be determined based on the information on the plurality of expected rotational frequencies and based on the path lengths for each of the plurality of wheels of the vehicle. The method may further comprise assigning predefined positions on the vehicle to each of the plurality of wheels based on the information on the plurality of expected rotational frequencies. Corresponding to the above, the method may further comprise receiving information related to tire pressures for each of the plurality of wheels of the vehicle, and receiving information related to a rotational frequency for each of the plurality of wheels of the vehicle. The method may comprise associating the information on the tire pressures to positions of each of the plurality of wheels based on the information related to the rotational frequency for each of the plurality of wheels and based on the information related to the expected rotational frequency for each of the plurality of wheels of the vehicle.

Embodiments further provide a computer program having a program code on a non-transitory media for performing, when the computer program is executed on a computer or on a processor, a method for determining information related to one or more expected rotational frequencies of one or more wheels of a vehicle. The method comprises determining expected path lengths of the one or more wheels of the vehicle based on information related to a path of the vehicle. The method further comprises determining the information related to the one or more expected rotational frequencies of the one or more wheels of the vehicle based on the expected path lengths of the one or more wheels.

An advantage of embodiments may be that information on the state of movement of the vehicle can be used to determine expected rotational frequencies of the wheels. Embodiments may therefore be independent from other systems such as ABS. Moreover, embodiments may localize a wheel on a vehicle without utilizing LF-initializers, and without determining RF reception levels. Embodiments may therefore be more cost effective, even compared to concepts using one asymmetric LF-transmitter per axis, e.g. one in the front and one in the back, making use of different LF-reception levels at the receivers.

It may be an advantage of embodiments that a comparison of rotational frequencies of other systems, such as ABS, may be circumvented. These systems may utilize information on a rotational frequency of each wheel at a centralized receiver. The information on the rotational frequencies may then be compared to the rotational frequencies of the ABS system. For some determined driving situations different rotational frequencies result and the correlation of the rotational frequencies determined through ABS and another sensor may be used to find the respective positions of the wheels. The determination of the rotational frequency may be a function of the TPMS module in the wheels. Embodiments may overcome the disadvantage of such systems, accessing the ABS information, which are conceivable in Original Equipment Manufacturer (OEM) systems, where a TPMS and an ABS system are provided or developed by the same tier. If TPMS and ABS are developed in separate tiers, for a conventional system a need for a standardized interface arises and additional connection or wiring may be necessary. Moreover, the ABS signal would have to be adapted to the correlation with respect to its data rate and its downtimes. Therefore, embodiments provide the advantage that they may not rely on ABS' or other capsulated system's signals and are therefore better suitable for after-market implementations.

Embodiments may enable a retro-fit application to existing systems. For example, an according device may be portable (phone, navigation/GPS system) and mounted into a vehicle using existing signal and/or sensor implementations. Some embodiments may correspond to a computer program, such as a loadable application, and may be installed to according programmable hardware. Some embodiments may communicate with a sensor or receive information from a sensor, such as a TPMS sensors installed on a vehicle, e.g. using an accordingly configured interface. For example, 4 TPMS modules may communicate with a receiver, which may, for example, be powered by a lighter plug in a car. The receiver may receive sub 1 GHz signals from the TPMS modules and may provide information related to the TPMS signals to an embodiment of a device, e.g. using Bluetooth. The embodiment of the device may correspond to a smart phone or navigation system and may display the tire pressures assigned to the positions of the corresponding wheels. The positioning of the tire pressure information to the corresponding wheel may be enabled automatically according to the above described embodiments.

BRIEF DESCRIPTION OF THE DRAWINGS

Some other features or aspects will be described using the following non-limiting embodiments of apparatuses and/or methods and/or computer programs by way of example only, and with reference to the accompanying figures, in which.

DETAILED DESCRIPTION

In the following some components will be shown in multiple figures, where consistent reference signs refer to functionally identical or similar components. Repetitive descriptions may be avoided for simplicity purposes. Features or components depicted in dotted lines are optional.

Figure 1A:
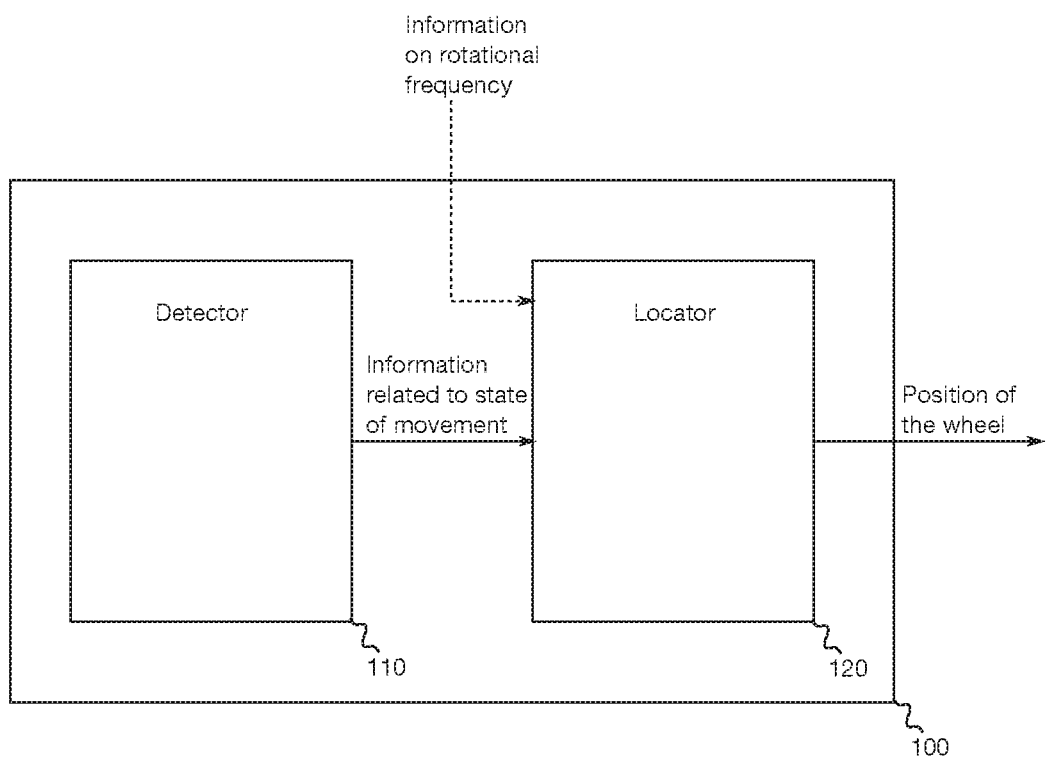
FIG. 1A shows an embodiment of a system for locating a position of a wheel.

FIG. 1a shows an embodiment of a system 100 for locating a position of a wheel on a vehicle. The system 100 comprises a detector 110 for obtaining information related to a state of movement of the vehicle, and a locator 120 for determining the position of the wheel based on the information related to the state of movement of the vehicle. The information on the state of movement may correspond to information related to a steering angle of the vehicle. The locator 120 may be operable to further use information on a rotational frequency of the wheel to determine the position of the wheel based on the information related to the state of movement or to the steering angle of the vehicle as indicated by the dotted arrow in FIG. 1a.

The information on the rotational frequency of the wheel may be obtained using an acceleration sensor, which may be further comprised in the system 100. The acceleration sensor may be installed on the wheel such that a sensitive axis of the acceleration sensor has a radial orientation. Hence it senses a change in the acceleration of gravity when the wheel turns, in particular a +/−g change.

In other embodiments, TPMS sensors may be used to determine the information on the rotational frequency of the wheel. A TPMS sensor may be mounted on the cover of the tire such that a g-pulse is measured when the TPMS sensor hits the surface of the road. An acceleration sensor may be used in the TPMS sensor, e.g. for that purpose. The TPMS sensor may be equipped with an energy harvester or a nano generator, e.g. as they are used in battery-free TPMS sensors, which convert the mechanical energy of the pulse when the TPMS sensor hits the ground into an electrical signal from which the information on the rotational frequency of the wheel can be determined. In further embodiments the system may use an acceleration or shock sensor to determine the information on the rotational frequency of the wheel, e.g. by making use of gravity. Yet another embodiment of the system may comprise a TPMS sensor to obtain the information on the rotational frequency of the wheel by evaluating the cyclic variations of the TPMS-RF signals.

In the embodiment depicted in FIG. 1a the locator 120 is operable to use information on rotational frequencies for each of a plurality of wheels on the vehicle, e.g. the four wheels of a car. Moreover, the locator 120 is operable to determine a position for each of the plurality of wheels on the vehicle based on the information on the plurality of rotational frequencies and the information related to the state of movement of the vehicle, the information related to the steering angle, respectively. In other words, the system 100 may use multiple sensors for the determination of the rotational frequencies of the wheels, e.g. it may use one sensor per wheel.

The system 100, and also the device 500, which will be described in the sequel, illustrated in FIG. 1a, FIG. 1b, respectively, may form an autonomous system for locating the wheel, which is independent from other systems such as ABS, and other data from the vehicle. The independence can be achieved by using the information related to the state of movement or the steering angle of the vehicle, which may comprise information on a sense of a rotation of the vehicle and/or information on a direction of movement of the vehicle. The system 100 or the detector 110 may detect the information on the state of movement or the information related to the steering angle of the vehicle based on a corresponding sensor. In other embodiments information on the state of movement or on expected rotational frequencies may be received from a device 500. Such information may be in terms of different path lengths or expected rotational frequencies of one or more wheels. The system 100, the detector 110, or the locator 120 may comprise an accordingly configured interface to receive information related to path lengths or expected rotational frequencies. For example, the system 100 or the detector 110 may comprise an inertial sensor, which enables determination of the information related to the state of movement of the vehicle. Additionally or alternatively, the detector may comprise or use a magnetic sensor, which senses a signal from a power steering. The sensor may sense the position of magnetic checkmarks on a steering column or axis of the vehicle. Such a sensor may also be used for other functionalities such as ESP in the vehicle.

In other embodiments the system 100 or the detector 110 may comprise a micro-mechanical sensor (Micro-Electro-Mechanical Systems (MEMS)), an acceleration sensor, or a gyroscope for generating a signal based on which the state of movement is detectable. The inertial sensor may correspond to a rotation rate sensor or a combination of a rotation rate sensor and a single- or multi-axial acceleration sensor. A sensitive axis of the rotational rate sensor may be oriented basically orthogonal to a movement plane of the vehicle, such that the sensor can be used as yaw-sensor. In embodiments, the inertial sensor may not be located in a wheel but at a more central position, e.g. in the receiver for the TPMS-RF signals. Therefore, any additional power consumption evoked by the inertial sensor may not be relevant in embodiments; such additional power consumption may range at about 5 mA.

It is to be noted that in embodiments the absolute accuracy of such an inertial sensor may not be very high. As the sensor may only be used to determine a certain state of movement or a movement situation, e.g. a certain rotational rate or directional movement of the vehicle. In other words, a certain state of movement may be determined before the localization of the wheel is carried out. Since the accuracy or precision demands for the sensor are low, embodiments of the system 100 can be economically implemented. For example, a MEMS inertial sensor may be used, as it is produced in high numbers for other applications already.

Thus, an algorithm for localizing the wheel may be carried out in a certain state of movement of the vehicle; it may be carried out based on signals obtained in the certain state of movement of the vehicle, respectively. In other words, the detector 110 may use the inertial sensor to determine whether the vehicle moves along a left hand bend or along a right hand bend. Moreover, the detector 110 may determine whether the vehicle moves in a forward or in a backward direction. For example, a comparison of the rotational frequencies of the wheels with the rotational rate of the vehicle may determine or trigger an operating point for the localization. In some embodiments such trigger information may be received from a device 500. The detector 110, the locator 120, respectively, may then comprise an accordingly configured interface to receive the information. Thus, in embodiments the system 100 may also be operable to verify a signal indicating the rotational frequency of the wheel and a signal indicating the state of movement or the steering angle of the vehicle before using the signals as information to determine the position of the wheel. For example, the system 100 may be operable to verify that the rotational frequency of the wheel and a rotational rate of the vehicle, which is based on the state of movement or the steering angle of the vehicle, fulfill a predefined relation for a predefined time interval. In embodiments such verification may be carried out using different mechanisms. According to another embodiment, the locator 120 is operable to determine the position of the wheel when changes of the state of movement or the steering angle of the vehicle are below a predefined threshold for a predefined time interval. That is to say, the position of the wheel is determined when the state of movement or a steering angle of the vehicle is stable to a certain extent, e.g. when variations of a certain rotational rate or steering angle of the vehicle and the rotational frequencies of the wheels remain in certain boundaries.

The locator 120 may then assign predefined positions on the vehicle to each of the plurality of wheels based on the information on the plurality of rotational frequencies and on expected rotational frequencies, wherein the expected rotational frequencies are based on the information related to the state of movement or the steering angle. In line with what is described above, in some embodiments the sense of movement, i.e. whether the vehicle moves forward or backward and whether it rotates clockwise or counterclockwise, serves as basis for the localization and an inertial sensor may be used to generate a signal based on which the sense of movement is determined. In some embodiments the steering angle may be used. Other embodiments may use other means to determine the state or sense of movement, some further embodiments may localize the wheels based on one known wheel position additionally or alternatively to the use of information related to the state of movement or the steering angle of the vehicle. Some embodiments may determine the wheel positions based on information related to rotational frequencies of the wheels and based on information related to accelerations at the wheels, as will be detailed in the sequel. For example, in some embodiments other signals available from the vehicle may be used. For example, an indication on whether the vehicles moves forward or backward may be obtained from the transmission components, such as an indication for a reversing or back-up light. Moreover, signals from a power steering unit may be used to determine whether the vehicle steers towards a right hand bend or a left hand bend. The steering angle can be determined from such a power steering unit.

Furthermore, the information on rotational frequencies of the wheels may be used to determine information related to the state of movement or the steering angle. For example, if a certain rotational frequency is exceeded, e.g. a certain threshold for the rotational frequency, it may be assumed that the vehicle moves forward, as the backward speed of most vehicles is limited. A comparison of the minimum and maximum rotational frequencies of all tires may determine whether the vehicle moves along a bend since the tires closer to a center of a bend or curve rotate slower than tires farther away from the center of the curve. As will be shown in more detail subsequently, if a vehicle moves through a given bend, certain rotational rates or relations of the rotational rates result for its wheels.

In some embodiments a backward movement of the vehicle may be precluded using other measures as described above. In such an embodiment a rotational sensor with a single axis can be used to determine a signal based on which the information related to the state of movement is detected. The sensitive axis of such a sensor may then be oriented in parallel to the normal (z-axis) of the plane of movement of the vehicle. When the vehicle moves along a right hand bend the rotational sensor may provide a negative output signal, a positive output signal may result in a left hand bend. Backward movement may be precluded by determining a certain duration of such a signal, since long time backward movements are unlikely.

In some embodiments, determination or preclusion of a backward movement may be used to determine the sense of rotation of the vehicle. For example, a forward movement along a right hand bend may result in the same sense of rotation as a backward movement along a left hand bend. The determination or preclusion of the backward movement may then be used to distinguish the right and left hand wheels of the vehicle.

In order to distinguish four different states of movement using a combined sensor comprising a rotational rate sensor and a lateral acceleration sensor may be used as an inertial sensor in a particular embodiment. The sensitive axis of the acceleration sensor corresponds to the lateral axis of the vehicle (y-axis), i.e. to the axis pointing in the radial direction when the vehicle moves along a bend or curve. The outputs of the two sensors are given by the following table:

| Driving situation, state of movement | Rotational rate sensor | Acceleration sensor |
| --- | --- | --- |
| Forward, right hand bend | Negative | negative |
| Forward, left hand bend | Positive | positive |
| Backward, right hand bend | Positive | negative |
| Backward, left hand bend | Negative | positive |

The table shows that a non-ambiguous distinction of the four states is enabled using the combined sensor. In a similar way the driving situation or the state of movement may be determined from the steering angle. If the steering angle is to the left the vehicle moves along a left hand bend, if the steering angle is to the right the vehicle moves along a right hand bend. Embodiments may make use of the finding that the rotational frequencies of the wheels, e.g. of the four wheels of a car, differ by multiple percent especially when the vehicle moves along narrow curves or bends. This assumption is based on a further assumption that the circumference or the perimeter of the wheels is essentially similar. Some embodiments may assume that the localization of the wheels is carried out directly after a change of the wheels and that the air pressure in the tires of the wheels corresponds to a set pressure according to the respective manufacturer's requirements. This leads to the conclusion that the circumferences of the tires are essentially equal. Other embodiments may assume that the air pressure of all tires and their circumferences are the same.

Yet other embodiments may use TPMS signals to correct the information on the rotational frequencies. In other words, such embodiments may determine the rotational frequency of a wheel and the corresponding air pressure in the tire of the wheel. If the air pressure differs from a predefined air pressure setting for the wheel, the rotational frequency may be corrected accordingly, i.e. if the air pressure is too low a corrected rotational frequency may be increased, or decreased if the air pressure of the tire is too high. In other words, the locator 120 may be operable to determine a corrected rotational frequency of the wheel based on information on a tire pressure of a tire of the wheel and based on the rotational frequency of the wheel. The locator 120 may then be operable to determine the position of the wheel based on the corrected rotational frequency. Moreover, it is assumed that each wheel or sensor provides its signal together with a non-ambiguous IDentification (ID), such that each signal can be unambiguously associated to the respective wheel or sensor.

The algorithm of an embodiment may then comprise the following. At first, a reference wheel (unique ID) may be selected and based on the rotational frequency of the reference wheel and the rotational rate or the steering angle of the vehicle an advantageous operating point or state of movement of the vehicle is determined. Once the operating point is reached, the rotational frequencies of the four wheels are determined and compared. For a given state of movement or steering angle, e.g. a forward right hand bend, the relations of the rotational frequencies of the wheels are predetermined, e.g. which wheel has the highest and which wheel has the lowest rotational frequency. Thus expected rotational frequencies or relations thereof may be determined based on the state of movement or the steering angle. Each of the four wheels may then be associated with a respective position, e.g. by matching the expected rotational frequencies with the detected rotational frequencies of the wheels. The rotational rate and direction of movement of the vehicle may be determined based on signals which were measured by the inertial sensor or from signals being indicative of the steering angle of the vehicle. In some embodiments the procedure just described may be repeated until a certain statistical confidence is achieved.

Figure 1B:
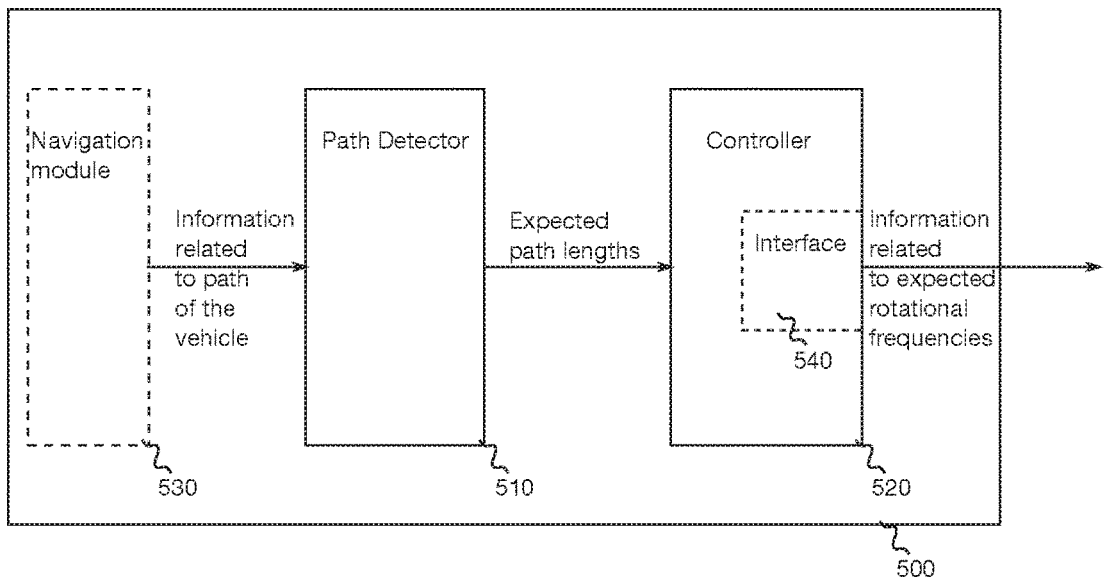
FIG. 1B shows an embodiment of a device configured to determine information related to one or more expected rotational frequencies.

FIG. 1b shows an embodiment of a device 500 configured to determine information related to one or more expected rotational frequencies, which may in some embodiments be used to determine the above information related to the state of movement of the vehicle. The device 500 comprises a path detector 510 configured to determine expected path lengths of the one or more wheels of the vehicle based on information related to a path of the vehicle. The device 500 further comprises a controller 520 configured to determine the information related to the one or more expected rotational frequencies of the one or more wheels of the vehicle based on the expected path lengths of the one or more wheels. As shown in FIG. 1b the device 500 may optionally comprise a navigation module 530 configured to determine the information related to the path of the vehicle based on information related to a route of the vehicle.

Figure 2:
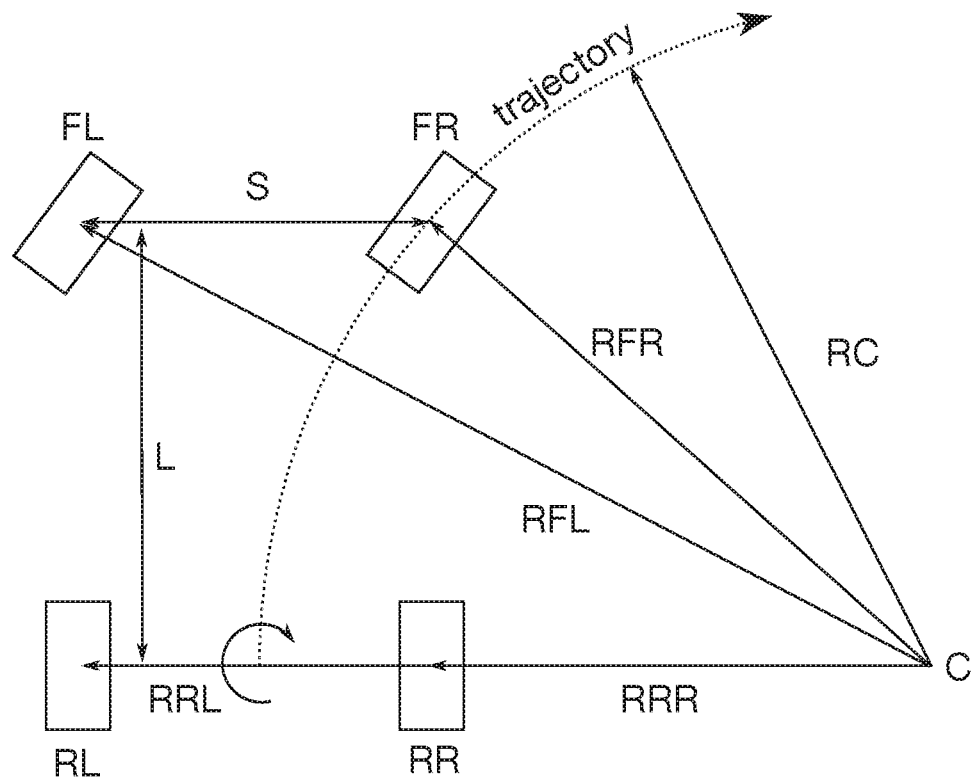
FIG. 2 shows four wheels of a vehicle, which are positioned in an embodiment.

In the following an embodiment will be described, wherein the controller 520 is further configured to determine the information related to the expected rotational frequencies of the one or more wheels of the vehicle based on predefined geometry information of the one or more wheels of the vehicle, as will be further detailed subsequently using illustrations shown in FIG. 2. FIG. 2 illustrates the four wheels of a vehicle in an embodiment. FIG. 2 shows two front wheels FL and FR, as well as two rear wheels RL and RR. Moreover, in the illustration of FIG. 2 it is assumed that the vehicle moves along a forward right hand bend, where the center of the bend or curve is indicated by C. The angle of the front wheels FL and FR indicates movement along the right hand bend. It is further assumed that the distance between left and right wheels is S, i.e. the distance between FL and FR, as well as between RL and RR, respectively. Moreover, the distance between front and rear wheels is assumed to be L, i.e. the distance between FL and RL, between FR and RR, respectively. FIG. 2 further depicts the radii of each of the wheels and the curve or trajectory itself using different arrows. The radius of the curve or bend itself is labeled RC, the radius of the RR wheel is termed RRR, the radius of the RL wheel is termed RRL, the radius of the FL wheel is termed RFL, and the radius of the FR wheel is termed RFR. Furthermore, the trajectory of the FR wheel is given using a dotted arrow, which points along a circular segment. Furthermore, if the paths of a vehicle, e.g. whether it moves through right hand or left hand bend, the path lengths of each of its wheel may be determined. The depicted geometry allows determining the radii of each wheel and hence information on the path lengths of the individual wheel, at least of a relation between the path lengths of the wheels.

The geometry of the vehicle shown in FIG. 2 allows deriving expected rotational frequencies of wheels and relations thereof based on the distances L, S, and RC, the path of the vehicle, respectively. As it can be seen from FIG. 2 each of the wheels travels along a different radius (RRR, RRL, RFL, RFR) around the center C of the curve, resulting in different distances, and thus in different rotational frequencies, when equal circumferences for the wheels are assumed. The velocity of each wheel is then proportional to the radius of the wheel's trajectory, to its rotational frequency, respectively. Moreover, the shorter the radius of the curve, i.e. the narrower the curve, the higher the difference in the individual radii (RRR, RRL, RFL, RFR). The radii can be given using the following equations:

$$RRL = RC + \frac{S}{2},$$

$$RRR = RC - \frac{S}{2},$$

$$RFL = \sqrt{L^2 + \left(RC + \frac{S}{2}\right)^2}, \text{ and}$$

$$RFR = \sqrt{L^2 + \left(RC - \frac{S}{2}\right)^2}.$$

Figure 3:
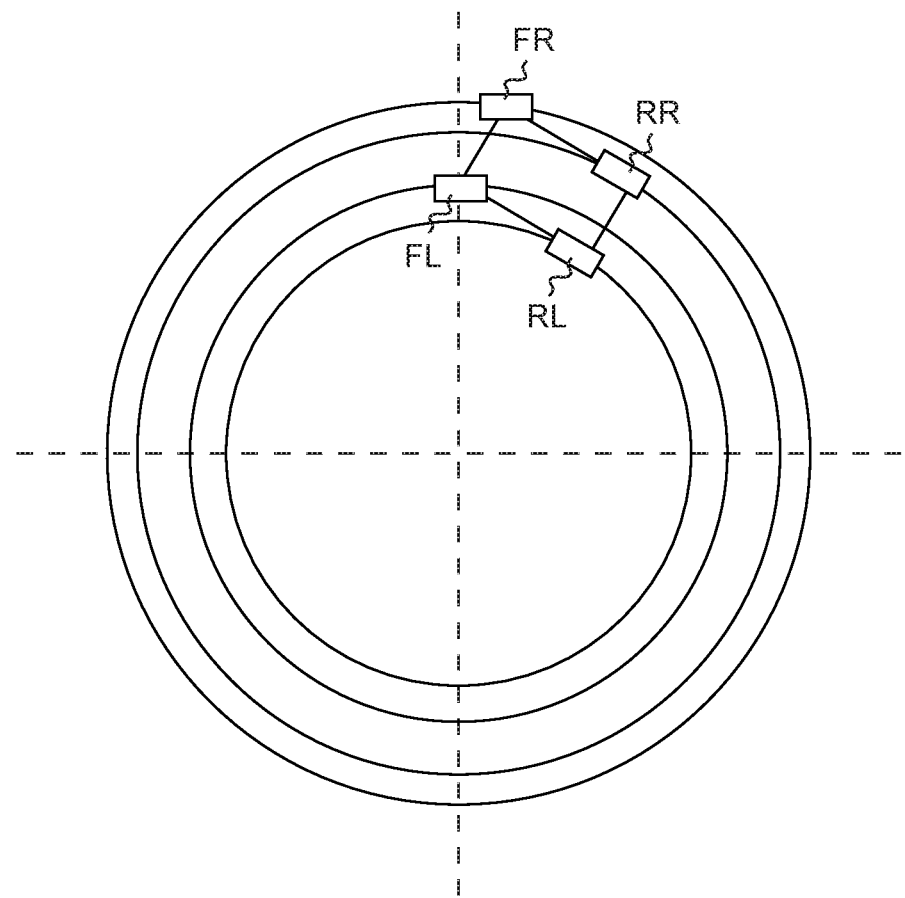
FIG. 3 shows four wheels of a vehicle, which are positioned in an embodiment, from an overview perspective depicting the differences in the travel distances of the wheels.

The equations show that the difference in the rotational frequencies of the wheels depends on the radius RC of the curve itself (the path of the vehicle), the wheel base L, and the wheel track S. FIG. 3 shows four wheels (FR, RR, FL, RL) of a vehicle, which are positioned in the embodiment. The overview perspective depicts the differences in the travel distances of the wheels. From FIG. 3 it can be seen that the four wheels travel different distances when the vehicle moves along a bend as they travel along circles with different diameters and hence with different circumferences. The relative differences in the distances depend on the steering angle, which determines the radii of the circles. According to some embodiments the steering angle, the path of the vehicle, the velocity of the vehicle or the differences in the travel distances of the wheels and/or the geometry of the vehicle (wheel base, track gauge, size of the tires) may serve as a basis for determining expected rotational frequencies or at least an order of expected frequencies of the wheels of the vehicle. With the signals of an TPMS-sensor, which comprises an acceleration sensor and senses acceleration changes while rotating in gravitation, the rotational frequencies of the wheels and hence the order of them, can be determined as well. Correlating or matching these signals or their order then allows assignment of a TPMS-signal to the respective wheel and hence their positions.

In some embodiments the information related to the rotational frequencies comprises information related to an order of expected rotational frequencies or expected path lengths of a plurality of wheels of the vehicle, which may then be used for an according correlation. The controller 520 of the embodiment illustrated in FIG. 1b may be configured to determine one or more positions of the one or more wheels of the vehicle based on the information related to the expected rotational frequencies of the one or more wheels, e.g. using the above-described correlation. The controller 520 may optionally comprise an interface 540 configured to provide the information related to the one or more expected rotational frequencies of the one or more wheels of the vehicle to a system 100 for locating a position of a wheel on a vehicle. The interface 540 may be configured to provide information related to a trigger when to determine the position of a wheel and the controller 520 may be configured to provide the information related to the trigger, when the expected rotational frequencies of the one or more wheels of the vehicle fulfill a predefined criterion, for example, when differences of path lengths or expected rotational frequencies lie above a predefined threshold. Accordingly, the above described detector 110 or locator 120 may comprise an interface to receive information on an expected rotational frequency from the device 500 configured to determine information related to one or more expected rotational frequencies of one or more wheels of the vehicle. The locator 120 may then use the information on the expected rotational frequencies for an according correlation.

In some embodiments the controller 520 may comprise an interface 540 configured to receive information related to one or more tire pressures of the one or more wheels of the vehicle. The interface 520 may be further configured to receive information related to one or more rotational frequencies of the one or more wheels, for example, from one of the above described sensors or from the detector 110 or locator 120, respectively. An according correlation may then be carried out by the controller 520. For example, the controller 520 may be configured to associate the information related to the one or more tire pressures to one or more positions of the one or more wheels based on the information related to the one or more rotational frequencies and based on the information related to the one or more expected rotational frequencies of the one or more wheels of the vehicle.

Embodiments may enable to position or locate positions of signals received from TPMS sensors. The path detector 510 may be configured to determine an expected path length for each of a plurality of wheels on the vehicle based on the information related to the path of the vehicle. The controller 520 may be configured to determine information related to an expected rotational frequency for each of the plurality of wheels on the vehicle, and the controller 520 may be configured to determine a position for each of the plurality of wheels on the vehicle based on the information on the plurality of expected rotational frequencies and based on the expected path lengths for each of the plurality of wheels of the vehicle. For example, the controller 520 may be configured to assign predefined positions on the vehicle to each of the plurality of wheels based on the information on the plurality of expected rotational frequencies.

In some embodiments the device 500 may comprise an interface configured to receive information related to tire pressures for each of the plurality of wheels of the vehicle. The interface may be further operable to receive information related to a rotational frequency for each of the plurality of wheels of the vehicle. The controller 520 may be configured to associate the information on the tire pressures to positions of each of the plurality of wheels based on the information related to the rotational frequency for each of the plurality of wheels and based on the information related to the expected rotational frequency for each of the plurality of wheels of the vehicle.

For example, a navigation system may comprise the device 500, which determines the differences in the path lengths of the wheels. The device 500 may select a vehicle path in which the differences in path length or travel distances of the wheel are significant enough to enable clear distinction of the wheels by their path lengths or rotational frequencies. For example, a motorway junction or interchange may have a typical diameter of 60 m, which may lead to differences in path lengths between inner and outer wheels in the bend or curve of about 5%. A rotary intersection or a roundabout with diameter of 15 m may provide differences of about 20%. In some embodiments a TPMS-sensor may transmit tire pressure information in equidistant time intervals to a receiver, the rotational frequency of the wheel may be determined based on these signals or the signal may comprise information related to the rotational frequency already determined by the TPMS-sensor. In some embodiments the TPMS-sensor may provide tire pressure information after a predetermined number of wheel rotations, which allows determining information on the rotational frequency or the path length of a wheel from the time between subsequent provisions of the tire pressure information. Information on the rotational frequency of a wheel may hence be determined from the tire pressure signals and may then be correlated with the expected rotational frequencies to locate the corresponding tire on the vehicle.

FIG. 3 displays an example of a vehicle travelling along a left hand bend. The trajectories of the wheels correspond to circles and they show that the wheel closest to the center of the bend or curve, i.e. wheel RL travels the shortest distance, followed by wheel FL, which travels the second shortest distance. The wheel FR, which is located the farthest away from the center, travels the longest distance and wheel RR travels the second farthest distance and lies between the wheels FR and FL. FIG. 3 further shows that the differences between the radii of the wheel closest to the center and the wheel farthest from the center approximately matches the wheel base of the vehicles, which approximately may, for example, correspond to 1.5 m.

Figure 4:
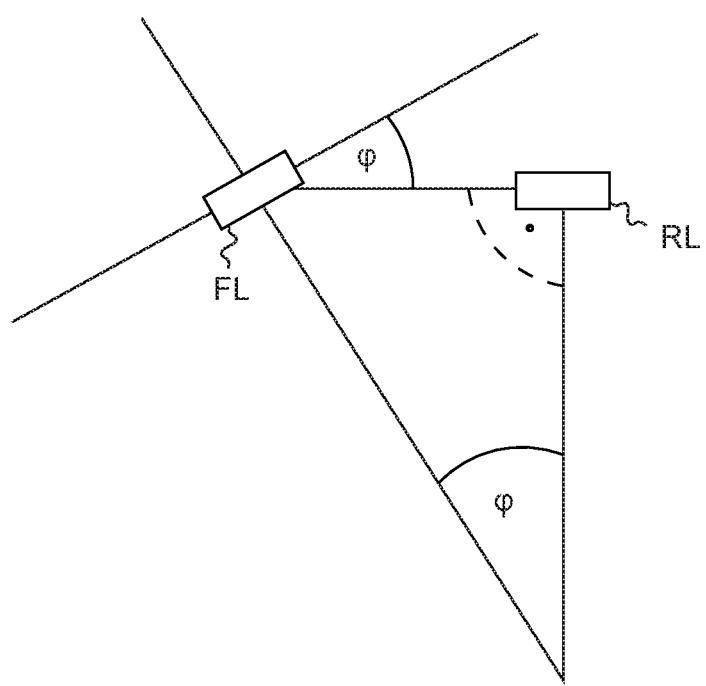
FIG. 4 depicts the dependency of the angle between the wheels and the steering angle.

FIG. 4 depicts the dependency of the angle between the wheels and the steering angle. As the rear axis of the vehicle depicted in FIG. 4 is assumed to be non-steered, i.e. it points along the radius of the bend, the relation between radii of the FL wheel and the RL wheel correspond to the cosine of the angle φ, which also corresponds to the steering angle. In line with the Figures, the distances or rotational frequencies of the wheels can be determined from the geometric evaluations. In embodiments a TPMS-sensor may provide the TPMS-signals in regular time frames, i.e. the signals with information related to the pressure of the tires may be transmitted on a fixed time frame, such as every 1 s, 2 s, 5 s, 10 s, 15 s, 20 s, 25 s, 1 min, etc. In such embodiments a TPMS-sensor may transmit information on the rotational frequency of the wheel along with the pressure information. For example, the number of rotations of the wheel since the last transmission or a present rotational frequency may be included. In other embodiments such signals may be transmitted on a rotational frame basis. That is to say that the TPMS sensor may transmit the pressure signal every predefined number of rotations, such as every 3, 5, 10, 15, 20, 25, 50, etc. rotations. From the time between two or more transmissions of the pressure signals of a wheel, the locator may conclude on the rotational frequency. In other words, the time span between two transmissions of the pressure signal for a wheel is indicative of the distance the wheel traveled since the last transmission. In both cases the determined data can be correlated with the data determined based on the state of movement or the steering angle as basis for the positioning of the respective wheels.

Considering the geometry of a typical compact car, e.g. a Volkswagen Golf, and different radii RC of the curve the following table can be calculated using the above equations and using the RR wheel as a reference. A forward movement along a right hand curve yields:

| Radius of the Curve | Relative rotational frequency with respect to RR | | | |
|---|---|---|---|---|
| RC [m] | RR, wheel 1 [%] | FR, wheel 2 [%] | RL, wheel 3 [%] | FL, wheel 4 [%] |
| 5.0 | 0.00 | 14.54 | 26.69 | 33.03 |
| 7.5 | 0.00 | 6.58 | 18.62 | 22.29 |
| 10.0 | 0.00 | 3.66 | 14.30 | 16.64 |
| 15.0 | 0.00 | 1.59 | 9.77 | 10.94 |
| 20.0 | 0.00 | 0.88 | 7.41 | 8.12 |
| 25.0 | 0.00 | 0.56 | 5.98 | 6.44 |

The table shows that the relative difference in the rotational frequencies increases with decreasing radius RC of the curve or bend, and so do the travel distances of the wheels, respectively. Therefore, some embodiments may determine a movement along a narrow curve as an operating point. In other words, in some embodiments it is verified that the vehicle moves along a narrow curve before determining the rotational frequencies based on which the wheels are positioned. Determination of such an operating point may therefore correspond to the determination of a small radius RC of the curve. In some embodiments a measurement of the rotation rate of the vehicle may not be sufficient, since a fast movement along a curve or bend with a large radius may result in the same rotational rate for the vehicle as a slow movement along a curve or bend with a small radius. Some embodiments may therefore evaluate a quotient of the rotational frequency of a reference wheel and the rotational rate for the vehicle, which is proportional to the radius of the curve and may therefore support the determination of a proper operating point, the travel distances of the wheels, respectively.

Figure 1C:
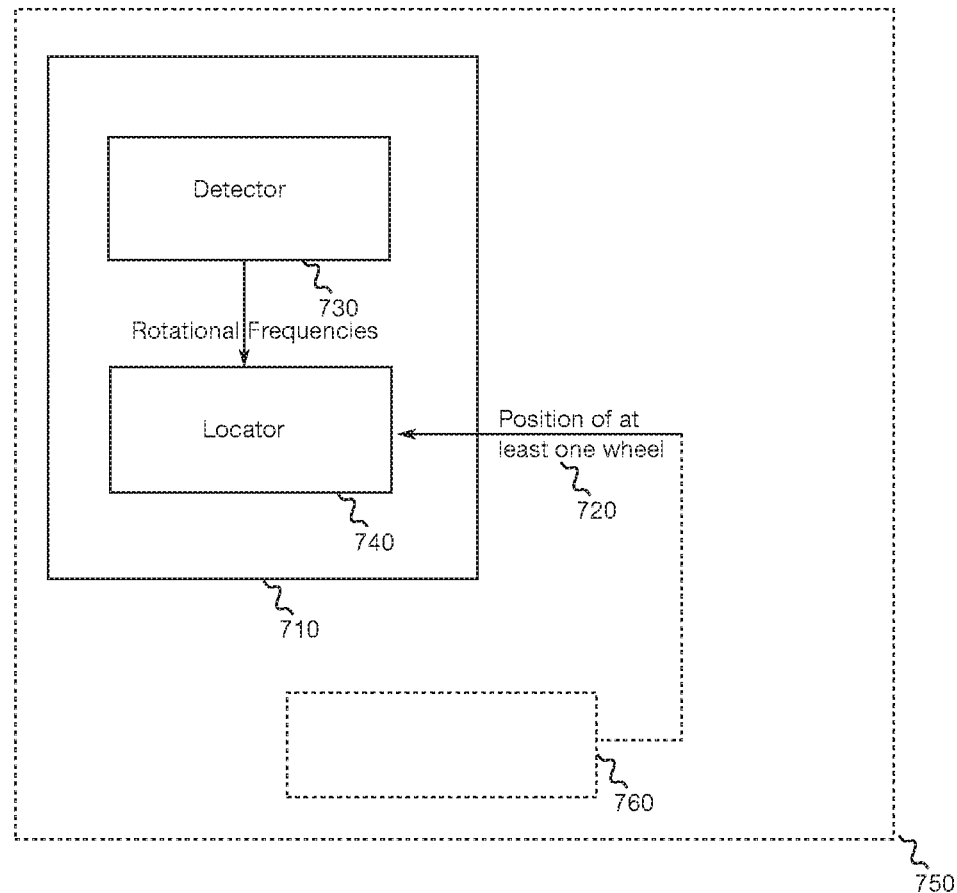
FIG. 1C shows an embodiment of a device and a system for locating a plurality of positions of a plurality of wheels on a vehicle.

Some embodiments are based on the classification of angular speed of the TPMS sensors into two possible solutions where an unknown variable to define the position of such sensors may be provided by the direction of the car (left curving or right curving). Detection of direction can, for example, thus be solved by using a gyroscope or an accelerometer mounted within the TPMS system. In the following another set of embodiments will be described, which make use of relations between the rotational frequencies of the wheels based on a known wheel position. Such an embodiment may reduce additional cost of a gyroscope or accelerometer. FIG. 1c shows an embodiment of a device 710 and an embodiment of a system 750 for locating a plurality of positions of a plurality of wheels on a vehicle. The device 750 may correspond to one or more devices, one or more modules, one or more units, any means for locating, etc. The device 750 may be implemented as chip, integrated circuit or software, which is executable on accordingly adapted hardware, such as a processor, a Digital Signal Processor (DSP), a multi-purpose processor, or the like.

The device 750 comprises an input to obtain information 720 related to a position of one wheel from the plurality of wheels. Such information, and any other information described herein, may be any indication, signal or value, e.g. analog or digital. In case of the information related to the position of the one wheel, said information may indicate that a wheel is at a certain position, e.g. FL, FR, RL, or RR at a four wheel vehicle. In general, the plurality of wheels may correspond to two or any higher number of wheels, e.g. 8 or 12 for a van or truck. The input itself may correspond to one or more connectors or interfaces, which allow transferring such information, e.g. in an analog or digital manner. For example, the input may correspond to a register into which involved entities can write certain values, read said values, respectively. An interface or input may use a certain access technology, protocol, medium, etc. to establish a connection or communication of information. As an example, in an embodiment the input may correspond to one or more radio frequency connectors, couplers, attenuators, or plugs, allowing a communication, connection, or signal transfer, signal attenuation, signal modification of the signals carrying corresponding information.

As further shown in FIG. 1c, the device 750 comprises a detector 730 to obtain information related to rotational frequencies of the one wheel and of at least one other wheel of the plurality of wheels. The detector 730 may make use of one or more sensors, sensor elements, or sensor units to obtain the information related to the rotational frequencies, for example, in line with the above described detectors 110, 210, 510. The detector 730 may correspond to one or more detector modules, one or more detector units, one of more detector devices, any means for detecting, etc. The device 750 further comprises a locator 740, which is coupled to the input and to the detector 730. The locator 740 is configured to determine information related to the position of the at least one other wheel based on the information related to the position of the one wheel and based on the information related to the rotational frequencies.

In embodiments the locator 740 may be implemented as one or more control/locator units, one or more control/locator devices, one or more control/locator modules, or any means for controlling/locating. In some embodiments the locator may be implemented in software, which is executable on accordingly adapted hardware, such as a processor, a Digital Signal Processor (DSP), a multi-purpose processor, or the like.

In line with the above table, during car driving, the wheels experience different angular speeds. For example, in case a car is turning right, the percentage of increased angular speed compared to the rear right wheel is given in the above table. By collecting a number of reads of such data from, for example, four sensors and by assuming that the car is moving forward, it can be found out which are the front wheels (wheels 2 and 4, cf. table above), the rear wheels (wheels 1 and 3, cf. table above) and the side pairs (wheels 1 with 2, wheels 3 with 4, cf. table above).

In some embodiments, instead of using a gyroscope/accelerometer or sensor which provides the actual direction (state of movement and/or steering angle) of the car based on which it can be determined if the reference wheel is the RR or RL, a known position of one wheel may be used to determine the positions of the other wheels. By determining the position of at least one wheel with different methods, the relation as exemplified in the above table, allows for determining the other positions. For example, based on information on the position of one wheel and based on four angular speeds, all four wheel positions can be determined.

For example, the locator 740 may be configured to determine the information related to the position of the at least one other wheel based on at least one predetermined relation between a rotational frequency of the one wheel and a rotational frequency of the at least one other wheel. In a simple two wheel case on a bike or motorbike, a front or rear distinction can be based on the position of one wheel, e.g. the identification of the front wheel is known, and the relation of the rotational or angular frequency. E.g. on a bike with a rear drive wheel, the rear wheel may statistically have a higher rotational frequency that the front wheel due to slippage. The position of one wheel and the relation of the rotational frequencies therefore allow positioning the other wheel.

In line with the above, the detector 730 may comprise at least one of an acceleration sensor, an energy harvester, a shock sensor, a tire pressure monitoring system sensor, or an optical sensor to obtain a signal comprising the information related to the rotational frequencies of the one wheel and the at least one other wheel. In some embodiments the input is configured to receive the information related to the position of the one wheel of the plurality of wheels from a Radio Frequency receiver (RFrx), which may be an implementation of a module 760, which is shown in FIG. 1c as optional component (broken line box) and which will be detailed subsequently. An RFrx may be used to wirelessly communicate with sensors or sensor modules at or in the tire, e.g. a tire pressure measurement or temperature module. In embodiments a receiver, transmitter, or transceiver, be it RF or low frequency, may comprise typical transmitter and/or receiver components. Such components may correspond to one or more devices, modules or units, any means for receiving, transmitting or both, respectively. It may comprise one or more transmit and/or receive antenna connectors or antennas, one or more Low Noise Amplifiers (LNA), one or more Power Amplifiers (PA), one or more filters, one or more converters, one or more mixers, one or more duplexers, one or more diplexers etc.

The information related to the position of the at least one wheel may comprise information related to an identification of a tire pressure measurement module of a wheel at a predetermined position, which may be received using the RFrx. The locator 740 may be configured to use information on rotational frequencies for each of the plurality of wheels on the vehicle and to determine a position for each of the plurality of wheels on the vehicle based on the information on the plurality of rotational frequencies and the information related to the position of the one wheel. For example, the locator 740 may be configured to assign predefined positions on the vehicle to each of the plurality of wheels based on the information related to the plurality of rotational frequencies and information related to relations between the rotational frequencies of the plurality of wheels, wherein the relations are based on the geometry of predetermined positions of the plurality of wheels. For example, the above table shows relations for different radii RC of a curve being calculated using the above equations, using the RR wheel as a reference, and assuming a forward movement along a right hand curve.

In an embodiment, the vehicle is a car comprising four wheels as plurality of wheels, wherein the detector 730 is configured to determine information related to relations of rotational frequencies of the four wheels. The locator 740 is configured to assign a predetermined position to each of the four wheels and the locator 740 is configured to assign the two wheels with the highest rotational frequencies to one side of the vehicle and the two wheels with the lowest rotational frequencies to the other side of the vehicle. Additionally or alternatively, the locator 740 may be configured to determine a relation of the rotational frequencies between the one wheel and a wheel assigned to the same side as the one wheel. The locator 740 may be configured to assign predetermined positions to the other wheels on the other side of the vehicle using the same relation. For example, when looking at the above table, one can find that independent from the radius the two wheels with the highest rotational frequencies are on the same side of the vehicle (the right hand side in this example). When looking at the wheels of one side, the right hand side for example, the front wheel rotates faster and thus, if the position of one wheel is known, the other positions can be determined.

FIG. 1c further illustrates an embodiment of a system 750 (shown in broken lines) for locating a plurality of positions of a plurality of wheels on a vehicle. The system 750 comprises the device 710 as described. The device further comprises a module 760, which is coupled to the input, and which is configured to provide the information related to the position of the one wheel to the locator 740 via the input. In some embodiments the module 760 comprises a memory for storing the information related to the position of the one wheel. Such a memory may correspond to any memory or storage capable of storing such information. Examples are Read Only Memory (ROM) for storing data, Random Access Memory (RAM), non-volatile storage, flash-memory, etc. In such an embodiment the information related to the position may be predetermined and stored, e.g. in terms of an identification of a tire pressure measurement component at a certain position of the vehicle. The identification may then be read from the module 760 and a rotational frequency obtained by the detector 730 may be assigned to it. From the relations to the other rotational frequencies and identification of tire pressure measurement modules associated with them, the positions of the other tire pressure measurement modules and tires or wheel they are coupled to can be determined.

In the following a number of embodiments are described, which use different mechanisms to obtain the information related to the position of the one wheel. The detector 730 may carry out a collection of angular speeds of wheels, information related thereto, respectively. The position of at least one wheel may be obtained by one of the following solutions:

In an embodiment at least one Low Frequency (LF) initiator is located close to one of the wheels, for example out of four wheels. Only one of four sensors (e.g. TPMS) located close to the LF initiator replies by sending its identification (ID). In such an embodiment the module 760 comprises a low frequency initiator located in the proximity of a tire pressure measurement module of the one wheel. The low frequency initiator is configured to initiate the tire pressure measurement module. The system 750 or the module 760 further comprises a radio frequency receiver configured to obtain information related to an identification of the tire pressure measurement module and to provide the information related to the identification as information related to the position of the one wheel via the input. The locator 740 then knows the identification at the position of the low frequency initiator and can proceed with locating the other tires based on the information related to the rotational frequencies as described above.

In another embodiment at least one LF initiator is located close to one of the wheels. The sensors measure the received LF power (LF Received Signal Strength Indicator (RSSI)) and send this information together with the sensor ID to the system, e.g. via RF. The sensor located closer to the LF initiator measures the highest LF power thus the position of this sensor is determined as the information related to the position of the one wheel. For example, the radio frequency receiver is configured to receive information related to low frequency signal reception quality, e.g. RSSI, at multiple tire pressure measurement modules located in multiple tires as information related to the position of the one wheel. The locator 740 is configured to determine the position of the one wheel based on the information related to the signal reception quality. For example, the one with the best RSSI is closest to the LF initiator or the one with the worst RSSI is located the farthest away from the LF initiator, etc.

In another embodiment a TPMS RF receiver is located such that the RSSI of the received signal of one of the, for example, four sensors has always the highest RF RSSI (typically the position of the sensor closer to the receiver is thus known), or the TPMS RF receiver is located such that the RSSI of the received signal of one of the sensors has always the lowest RF RSSI (typically the position of the sensor farthest away from the receiver is known). The information related to the signal reception quality may then comprise identification information of a tire pressure measurement module at which the signal was received. The module 760 may then comprise the radio frequency receiver located in the proximity of a tire pressure measurement module of the one wheel. The radio frequency receiver is configured to receive a radio signal from the tire pressure measurement module and to obtain information related to an identification of the tire pressure measurement module. The radio frequency receiver is then configured to provide the information related to the identification as information related to the position of the one wheel via the input, e.g. the one with the best/worst RSSI. The radio frequency receiver may be further configured to determine information related to receive signal strength of multiple tire pressure modules and to provide the information related to the receive signal strength from the multiple tire pressure measurement modules as information related to the position of the one wheel. The locator 740 may then be configured to determine the position of the one wheel based on the information related to the receive signal strength in line with the above.

Manual localization of at least one of the (e.g. four) sensors by triggering the transmission of one of the sensors by handheld may be used in yet another embodiment. The ID of the one sensor may then be stored in a memory as described above.

Figure 9:
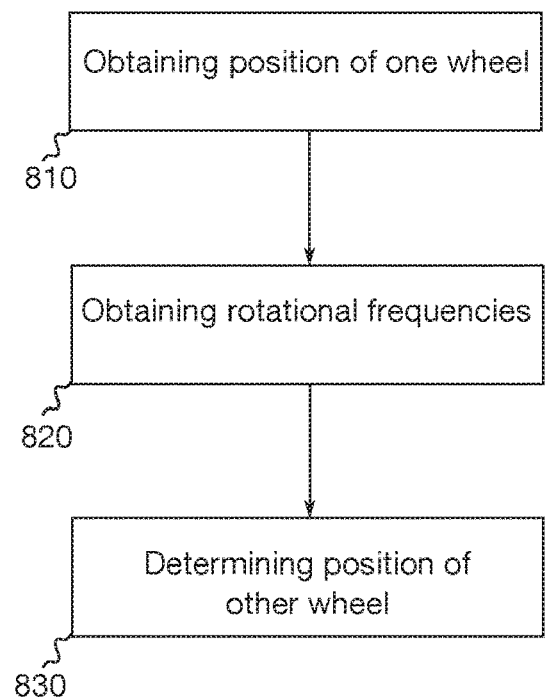
FIG. 9 shows a flow chart of an embodiment of a method for determining wheel positions.

FIG. 9 shows a flow chart of an embodiment of a method for determining wheel positions on a vehicle, for example four position of four wheels of a car. The method comprises obtaining 810 information related to a position of one wheel from the plurality of wheels, and obtaining 820 information related to rotational frequencies of the one wheel and of at least one other wheel of the plurality (four) of wheels. The method further comprises determining 830 information related to the position of the at least one other wheel (e.g. the three other wheels) based on the information related to the position of the one wheel and based on the information related to the rotational frequencies.

Embodiments also provide a computer program having a program code on a non-transitory media for performing, when the computer program is executed on a computer or on a processor, a method for locating a plurality of positions of a plurality of wheels on a vehicle. The method comprises obtaining information related to a position of one wheel from the plurality of wheels, and obtaining information related to rotational frequencies of the one wheel and of at least one other wheel of the plurality of wheels. The method further comprises determining information related to the position of the at least one other wheel based on the information related to the position of the one wheel and based on the information related to the rotational frequencies.

In the following further embodiments will be detailed. Additionally or alternatively these embodiments make use of information related to rotational frequencies of the wheels and information related to accelerations of the wheels. Such information may be obtained using accordingly configured sensors, sensor elements, etc. according to the above description. For example, signals from an Angular Position Sensor (APS) may be used to obtain information on the angular phases of the wheels, which may then be used as a basis for determining the rotational frequencies, information related thereto, respectively. In Angular Position Sensing, the respective TPMS sensor takes multiple samples of the signal of the acceleration sensor and the TPMS sensor determines from the gravity influence g to the acceleration signal angular phase information of the wheel at a specific time. The gravity influence g provides a periodic+/−1 g signal in the acceleration signal. By taking samples distributed around the specific time, the angular phase and the angular rotation frequency of the tire at the specific time can be determined by fitting the gravity influence. In one embodiment, the angular phase information and angular rotation frequency can then be transmitted to the locator. The locator can provide localization based on the various rotation frequencies or angular speed the wheels or based on changes of the rotation frequencies or angular speed of the wheels.

Figure 1D:
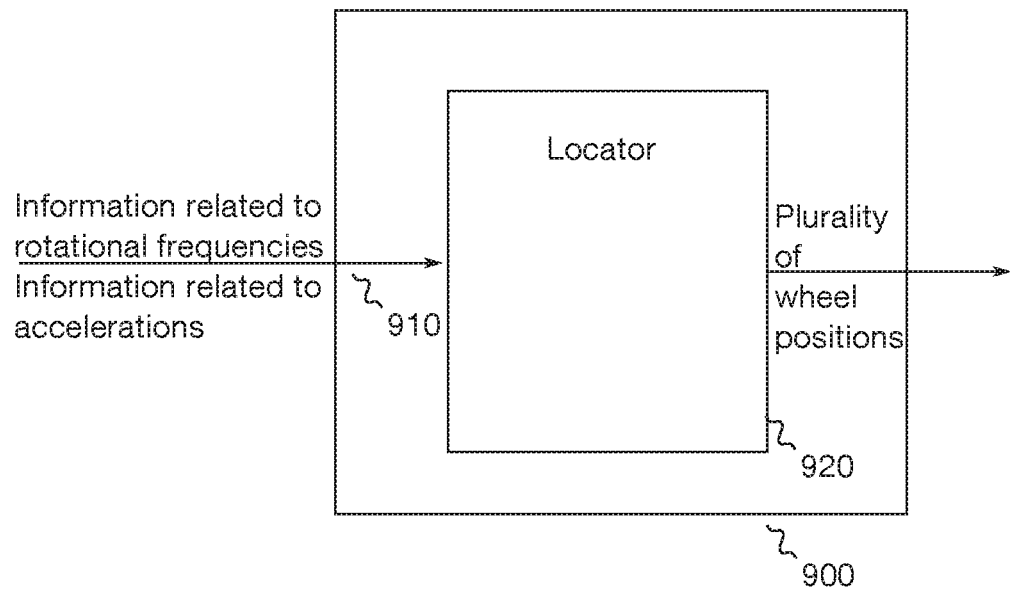
FIG. 1D shows another embodiment of a device for locating a plurality of positions of a plurality of wheels on a vehicle.

Moreover, one or more acceleration sensors or modules may be used at or in the wheels, e.g. as part of TPMS sensors to obtain information related to the accelerations at the wheels. FIG. 1d shows another embodiment of a device 900 for locating a plurality of positions of a plurality of wheels on a vehicle. In line with the above description the device 900 may be implemented as one or more devices, modules, units, means for locating, software, programmable hardware component etc. As shown in FIG. 1d the device 900 comprises one or more inputs 910 to obtain information related to rotational frequencies of the plurality of wheels and information related to accelerations at the plurality of wheels. The device 900 further comprises a locator 920, which is coupled to the one or more inputs 910. The locator 920 is configured to determine the plurality of positions of the plurality of wheels based on the information related to the rotational frequencies of the plurality of wheels and based on the information related to the accelerations at the plurality of wheels.

The information related to the accelerations at the plurality of wheels may comprise information related to accelerations of multiple directions at the plurality of wheels. For example, 2 g sensors may be used to determine the information related to the accelerations and the accelerations may correspond to tangential and radial acceleration of the wheel. The relation, e.g. the phase relations between the accelerations of the different directions may allow determining on which side of the vehicle an acceleration sensor, e.g. as part of a TPMS module, is located. Therewith the corresponding sensor and wheel can be located. Embodiments may therewith enable to distinguish wheels located on the right and left hand side of the vehicle. It is to be noted that axial accelerations of the wheel may also be obtained. The axial acceleration of wheels located on different sides of the car experience inverted axial acceleration if the sensors have the same orientation with respect to the driving axis of the vehicle. Hence, axial accelerations may be used to carry out a right-left distinction, e.g. in a certain curve or using statistical data.

The locator 920 is then configured to determine the information related to the plurality of positions based on assigning predetermined wheel positions along a longitudinal axis of the vehicle and based on assigning predetermined wheel positions along a lateral axis of the vehicle. For example, the locator 920 is configured to assign the predetermined wheel positions along the longitudinal axis of the vehicle based on the information related to the rotational frequencies of the plurality of the wheels. Additionally or alternatively, the locator is configured to assign the predetermined positions along the lateral axis of the vehicle based on the information related to the acceleration at the plurality of the wheels.

As the above table with respect to the four relative rotational frequencies of the wheels of a car shows, some of the relations can be exploited in order to assign the wheels to the predetermined positions. For example, the fastest and third fastest wheels are located in front, the others in the rear of the vehicle. While the above table illustrated said relation for a right hand curve, the same is also true for a left hand curve. If such information on the relations of the rotational frequencies is gathered continuously or for a period of time, a statistical superposition of the data can be achieved. Data on the rotational frequencies may hence be collected for right hand curves, left hand curves, sections of straight driving, etc. Even such superposition may be used in embodiments, as the relation of the frequencies, e.g. fastest wheel in front, will not be changed by the superposition. With the right-left distinction embodied with the help of the information related to the accelerations, the wheel positions can be determined. For example, in a more detailed embodiment, a left/right distinction is made by means of 2 g-sensors and a front/back distinction is made by means of APS. Such an embodiment measures the angular speed of the wheel with APS and determines if a wheel is located in the front or in the rear of the vehicle. The determination if the wheels are left or right is carried out by means of 2 g sensors mounted in a TPMS module.

Figure 10:
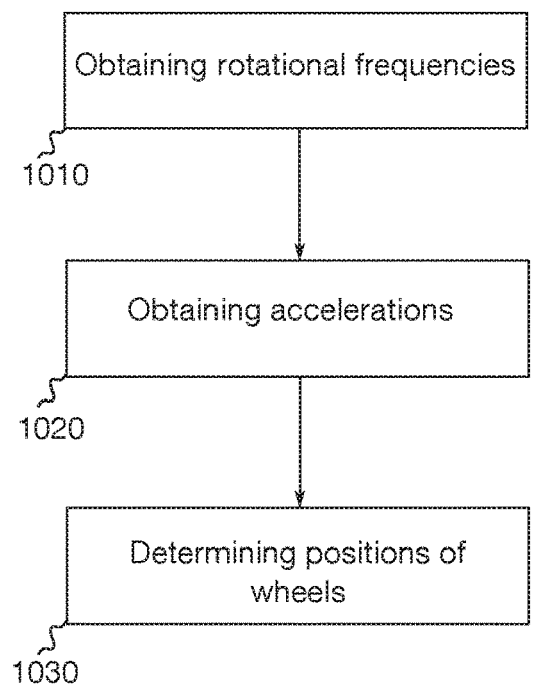
FIG. 10 shows a flow chart of another embodiment of a method for determining wheel positions.

In another embodiment the plurality of wheels comprises four wheels of a car having a front axis and a rear axis, just as exemplified in the above table. The locator 920 is configured to determine whether a wheel is located on the front axis or on the back axis based on the information related to the rotational frequencies of the wheels, e.g. making use of knowing that the fastest and the second slowest wheels are located on the front axis. The locator 920 is further configured to determine whether a wheel is located on the right or left side of the car based on the information related to the accelerations at the four wheels, e.g. using radial, tangential, and/or axial acceleration information. For example, the information related to the acceleration comprises information related to tangential and radial acceleration at the four wheels. FIG. 10 shows a flow chart of another embodiment of a method for determining wheel positions. The method comprises obtaining 1010 information related to rotational frequencies of the plurality of wheels, and obtaining 1020 information related to accelerations at the plurality of wheels. The method further comprises determining 1030 the plurality of positions of the plurality of wheels based on the information related to the rotational frequencies of the plurality of wheels and based on the information related to the accelerations at the plurality of wheels.

Another embodiment is a computer program or computer program product having a program code on a non-transitory media for performing, when the computer program is executed on a computer or on a processor, the above method for locating a plurality of positions of a plurality of wheels on a vehicle.

The embodiments described herein may be combined, e.g. a known wheel position may be used to verify wheel positions that has been determined without making use of a known position and vice versa. It is therefore noted that the different concepts described herein may be combined. The components, e.g. inputs, locators, detectors, etc. described for the multiple embodiments may be implemented in similar manners in different embodiments. Therefore details on an implementation for one embodiment may be used in the other and vice versa, even if it is not explicitly mentioned in the description of the respective embodiment.

As it has already been mentioned above in embodiments it may first be verified that the signals or frequencies which are used for such a comparison are stable to certain extent. For example, a certain time period may be evaluated during which variations of the respective signals are below a threshold. Embodiments may therefore prevent errors or deviations, which could occur when the vehicle moves along a sinuous line at a higher speed. In implementations of embodiments, advantageous ranges for the rotational frequencies of the wheels and the rotational rate of the vehicle may be determined experimentally.

Embodiments may also provide a device comprising a wheel localizer to determine for each of a plurality of wheels of a vehicle a position, the wheel localizer being configured to determine a wheel position based on information indicating a rotational frequency of each wheel and information related to a rotation of the vehicle or a steering angle of the vehicle.

Figure 5:
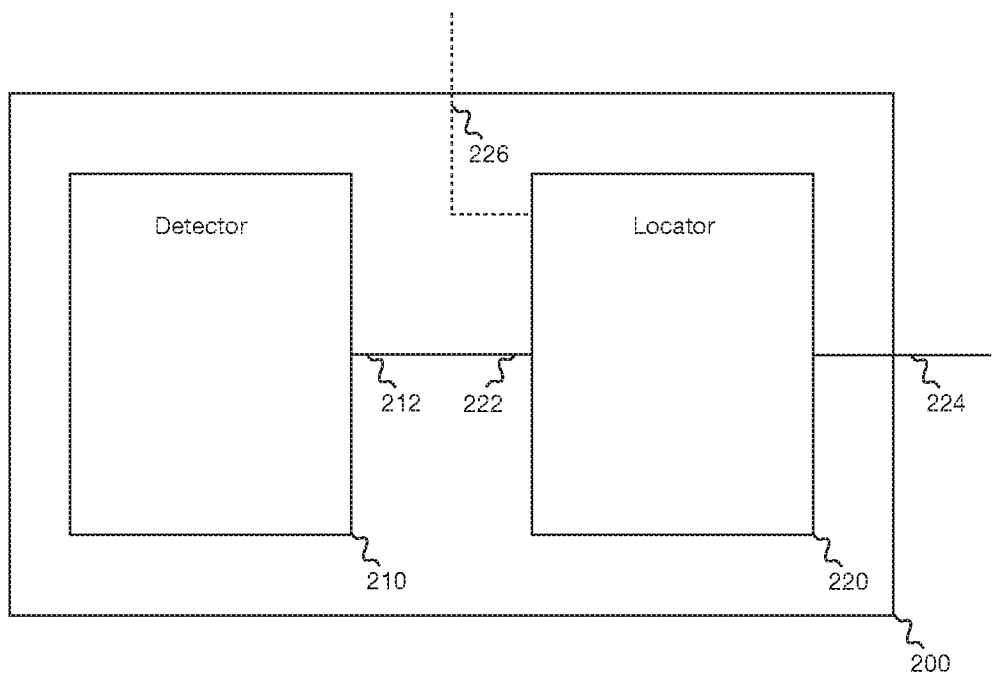
FIG. 5 illustrates an embodiment of a wheel localizer.

In embodiments the system 100 of FIG. 1*a*/1*c* may be implemented as a wheel localizer 200 for locating a position of a wheel on the vehicle. FIG. 5 illustrates an embodiment of a wheel localizer 200. The wheel localizer 200 comprises a detector 210 with an output 212 for a movement or steering signal comprising information on a state of movement or a steering angle of the vehicle. The detector 210 may correspond to the above described detector 110. The wheel localizer 200 further comprises a locator 220 with an input terminal 222 for the movement signal or a steering angle signal, and an output 224 for a location signal comprising information on the position of the wheel, which is based on the information on the state of movement or the steering angle of the vehicle. As shown in FIG. 5 the input 222 of the locator 220 is coupled with the output 212 of the detector 210. The locator 220 may correspond to the above described locator 120.

In line with the above description, the detector 210 may comprise at least one of a sensor, an inertial sensor, a micro-mechanical sensor, an acceleration sensor, or a gyroscope for sensing the state of movement of the vehicle. In other embodiments the detector 210 may comprise at least one of an angular sensor, a traverse arm position sensor, a magnetic sensor, or an optical sensor, wherein each are configured to sense the steering angle of the vehicle. The locator 220 may further comprise an additional input 226, which is indicated in FIG. 5 by the dotted line, for a signal comprising information on a rotational frequency of the wheel. In embodiments at least one of a sensor, an acceleration sensor, an energy harvester, a shock sensor, or a tire pressure monitoring system sensor may be coupled to the locator 220, to provide a signal comprising information on a rotational frequency of the wheel.

In line with what was described above, the locator 220 may also comprise one or more inputs 226 for signals comprising information on a plurality of rotational frequencies for each of a plurality of wheels. The locator 220 may be operable to determine a plurality of locations for the plurality of wheels on the vehicle, based on the information on the plurality of rotational frequencies and on the information of the state of movement or information on the steering angle. The locator 220 may be operable to assign predefined positions on the vehicle to each of the plurality of wheels based on the information on the plurality of rotational frequencies and expected rotational frequencies, wherein the expected rotational frequencies are based on the information of the state of movement or the steering angle.

In further embodiments the wheel locator 200 may be operable to verify the signal comprising information on the rotational frequency of the wheel and the movement or steering signal comprising the information on the state of movement or the steering angle of the vehicle, before using these signals as information to determine the position of the wheel. The wheel localizer 200 may, for example, be operable to verify that the signal comprising the information on the rotational frequency of the wheel and the movement or steering signal comprising the information on the state of movement or steering angle of the vehicle fulfill a predefined relation for a predefined time interval.

Figure 6:
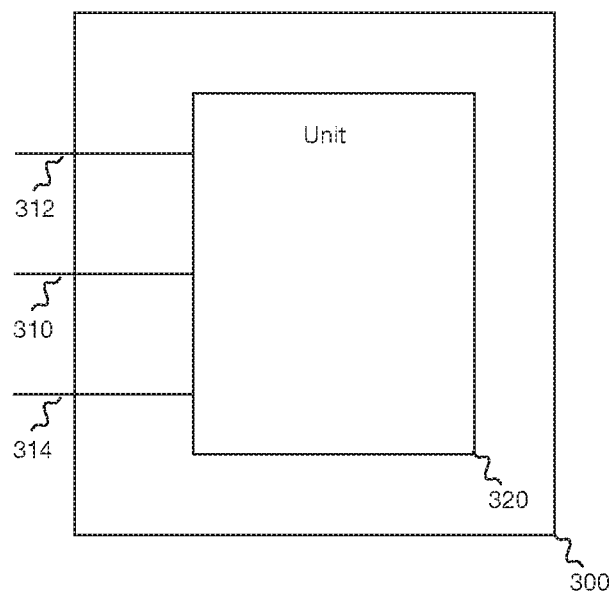
FIG. 6 illustrates an embodiment of a wheel localization device.

FIG. 6 illustrates an embodiment of a wheel localization device 300. The wheel localization device comprises an input 310 for receiving a signal comprising information on a state of movement or a steering angle of a vehicle. The device 300 further comprises an input 312 for receiving signals comprising information indicating rotational frequencies of each of a plurality of wheels of the vehicle, and an input 314 for receiving signals comprising information indicating a tire parameter for each of the plurality of wheels. In the embodiment in FIG. 6 separate inputs 310, 312 and 314 are shown. In other embodiments a single input 310 may be used for all signals instead. The device further comprises a unit 320 to assign to each of the plurality of wheels one location of a set of predefined locations based on the information on the state of movement or steering angle and the information on the rotational frequencies.

Figure 7:
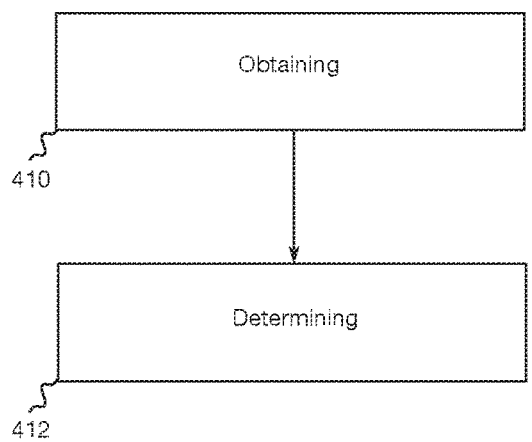
FIG. 7 shows a flow chart of an embodiment of a method for locating a position of a wheel on a vehicle.

Embodiments further provide a method. FIG. 7 shows a flow chart of an embodiment of a method for locating a position of a wheel on a vehicle. The method comprises obtaining 410 information related to a state of movement or related to a steering angle of the vehicle and determining 412 the position of the wheel based on the information related to the state of movement or the steering angle of the vehicle.

Figure 8:
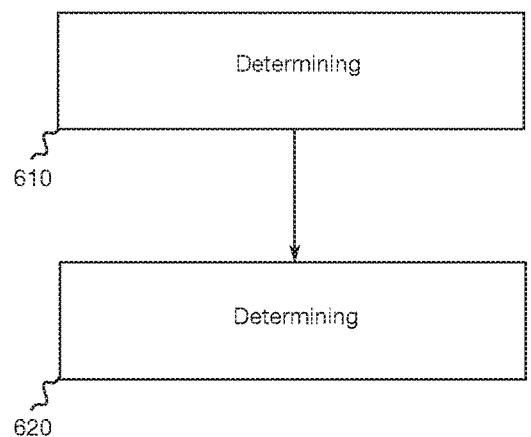
FIG. 8 shows a flow chart of an embodiment of a method for determining information related to one or more expected rotational frequencies of one or more wheels of a vehicle.

FIG. 8 shows a flow chart of an embodiment of a method for determining information related to one or more expected rotational frequencies of one or more wheels of a vehicle. The method comprises determining 610 path lengths of the one or more wheels of the vehicle based on information related to a path of the vehicle and determining 620 the information related to the one or more expected rotational frequencies of the one or more wheels of the vehicle based on the path lengths of the one or more wheels.

Embodiments may further provide a computer program having a program code for performing one of the above methods, when the computer program is executed on a computer or processor. A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform the steps of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", may be provided through the use of dedicated hardware, such as "a processor", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A device for locating a plurality of positions of a plurality of wheels on a vehicle, comprising:
   an input to obtain information related to a position of one wheel from the plurality of wheels;
   a detector to obtain information related to rotational frequencies of the one wheel and of at least one other wheel of the plurality of wheels; and
   a locator coupled to the input and to the detector, wherein the locator is configured to determine information related to the position of the at least one other wheel based on the information related to the position of the one wheel and based on the information related to the rotational frequencies.

2. The device of claim 1, wherein the locator is configured to determine the information related to the position of the at least one other wheel based on at least one predetermined relation between a rotational frequency of the one wheel and a rotational frequency of the at least one other wheel, and/or wherein the detector comprises at least one of an acceleration sensor, an energy harvester, a shock sensor, a tire pressure monitoring system sensor, or an optical sensor to obtain a signal comprising the information related to the rotational frequencies of the one wheel and the at least one other wheel.

3. The device of claim 1, wherein the input is configured to receive the information related to the position of the one wheel of the plurality of wheels from a radio frequency receiver, and/or wherein the information related to the position of the at least one wheel comprises information related to an identification of a tire pressure measurement module of a wheel at a predetermined position.

4. The device of claim 1, wherein the locator is configured to use information on rotational frequencies for each of the plurality of wheels on the vehicle and to determine a position for each of the plurality of wheels on the vehicle based on the information on the plurality of rotational frequencies and the information related to the position of the one wheel.

5. The device of claim 4, wherein the locator is configured to assign predefined positions on the vehicle to each of the plurality of wheels based on the information related to the plurality of rotational frequencies and information related to relations between the rotational frequencies of the plurality of wheels, wherein the relations are based on the geometry of predetermined positions of the plurality of wheels.

6. The device of claim 1, wherein the vehicle is a car comprising four wheels as plurality of wheels, wherein the detector is configured to determine information related to relations of rotational frequencies of the four wheels, wherein the locator is configured to assign a predetermined position to each of the four wheels, wherein the locator is configured to assign the two wheels with the highest rotational frequencies to one side of the vehicle and the two wheels with the lowest rotational frequencies to the other side of the vehicle.

7. The device of claim 6, wherein the locator is configured to determine a relation of the rotational frequencies between the one wheel and a wheel assigned to the same side as the one wheel, wherein the locator is configured to assign predetermined positions to the other wheels on the other side of the vehicle using the same relation.

8. The device of claim 1, further comprising a memory coupled to the input, wherein the memory is configured to store the information related to a position of one wheel from the plurality of wheels.

9. The device of claim 8, wherein the information related to a position of one wheel from the plurality of wheels comprises an identification code of a measurement device at a predetermined position of the vehicle.

10. The device of claim 9, wherein the detector is configured to ascertain the rotational frequency of the wheel associated with the identical code and assign the rotation frequency thereto.

* * * * *